(12) United States Patent
Miller

(10) Patent No.: US 6,967,993 B1
(45) Date of Patent: Nov. 22, 2005

(54) ULTRAWIDE BANDWIDTH SYSTEM AND METHOD FOR FAST SYNCHRONIZATION USING SUB-CODE SPINS

(75) Inventor: Timothy R. Miller, Washington, DC (US)

(73) Assignee: Freescale Semiconductor, Inc., Austin, TX (US)

( * ) Notice: Subject to any disclaimer, the term of this patent is extended or adjusted under 35 U.S.C. 154(b) by 774 days.

(21) Appl. No.: 09/684,401

(22) Filed: Oct. 10, 2000

Related U.S. Application Data

(60) Provisional application No. 60/217,099, filed on Jul. 10, 2000, provisional application No. 60/207,225, filed on May 26, 2000.

(51) Int. Cl.[7] ............................................. H04B 1/707
(52) U.S. Cl. .................................................... 375/150
(58) Field of Search ...................... 375/130, 140–142, 375/146, 147, 150, 316, 340, 343

(56) References Cited

U.S. PATENT DOCUMENTS

| | | | |
|---|---|---|---|
| 5,774,091 A | | 6/1998 | McEwan |
| 5,832,035 A | | 11/1998 | Fullerton |
| 5,841,808 A | * | 11/1998 | Rizzo et al. ................. 375/150 |
| 5,901,172 A | | 5/1999 | Fontana et al. |
| 6,239,741 B1 | * | 5/2001 | Fontana et al. ............. 342/135 |
| 6,351,246 B1 | | 2/2002 | McCorkle |
| 6,356,157 B1 | * | 3/2002 | Kawamura .................... 331/11 |
| 6,437,832 B1 | * | 8/2002 | Grabb et al. ................. 348/614 |
| 6,700,939 B1 | | 3/2004 | McCorkle |
| 6,763,057 B1 | * | 7/2004 | Fullerton et al. ........... 375/141 |
| 2003/0053554 A1 | * | 3/2003 | McCrokle .................... 375/295 |

OTHER PUBLICATIONS

R. Comerford, IEEE Specturm, pps. 35-41, "Handhelds Duke it Out for the Internet", Aug. 2000.

* cited by examiner

*Primary Examiner*—Kevin Burd
(74) *Attorney, Agent, or Firm*—Posz Law Group, PLC

(57) ABSTRACT

A UWB communication system and method for fast synchronization of one transceiver with another using the incoming UWB signal, where synchronization is achieved in less than a full code wheel spin. An exemplary embodiment includes a UWB waveform correlator, a timing generator, and a controller wherein the controller examines the correlator outputs as the code-wheel spins, and generates control signals to cause the timing generator to stop and track the incoming UWB signal whenever the incoming signal is received with sufficient SNR to provide a predetermined quality of service such as bit-error rate (BER). This embodiment will in any case determine when the receiver has been substantially synchronized with an incoming signal, yet without an exhaustive search of the entire code-wheel.

85 Claims, 17 Drawing Sheets

$Z1 = \{0, n, 2n, 3n, \ldots, (Q-3), (Q-2), (Q-1)\}$.

$Z2$ (first example) $= n*\{[0, m-1], [-1, -2m], [m, 5m-1], [-2m-1, -10m], \ldots, (Q-1)/n\}$.

$Z2$ (second example) $= \{0, n, 2n, \ldots, (m-1)*n, -n, -2n, \ldots, -m*n, m*n, (m+1)*n, (m+2)*n, \ldots, (Q-1)\}$.

$Z2$ (third example) $=\{-m*n, (-m+1)*n, (-m+2)*n, \ldots, -n, 0, n, \ldots, m*n, (m+1)*n, (m+2)*n, \ldots, 2m*n, (-3m)*n, (-3m+1)*n, (-3m+2)*n, \ldots, (-m-1)*n, (2m+1)*n, (2m+2)*n, \ldots, (Q-1)\}$.

ULTRAWIDE BANDWIDTH SYSTEM AND METHOD FOR FAST SYNCHRONIZATION USING SUB-CODE SPINS

CROSS-REFERENCE TO RELATED PATENT DOCUMENTS

This application claims benefit of priority to U.S. Provisional Applications Nos. 60/207,225 and 60/217,099 filed in the United States Patent and Trademark Office on May 26, 2000, and Jul. 10, 2000, respectively. The present document contains subject matter related to that disclosed in commonly owned, co-pending application Ser. No. 09/078,616 filed May 14, 1998, entitled ULTRA WIDE BANDWIDTH SPREAD SPECTRUM COMMUNICATIONS SYSTEM; Ser. No. 09/633,815, filed Aug. 7, 2000 entitled ELECTRICALLY SMALL PLANAR UWB ANTENNA; application Ser. No. 09/563,292, filed May 3, 2000 entitled PLANAR UWB ANTENNA WITH INTEGRATED TRANSMITTER AND RECEIVER CIRCUITS; application Ser. No. 60/238,466, filed Oct. 10, 2000, entitled ULTRA WIDE BANDWIDTH NOISE CANCELLATION MECHANISM AND METHOD; application Ser. No. 60/217,099 filed Jul. 10, 2000 entitled MULTIMEDIA WIRELESS PERSONAL AREA SYSTEM NETWORK (WPAN) PHYSICAL LAYER SYSTEM AND METHOD; application Ser. No. 09/685,203, filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/685,197, filed Oct. 10, 2000, entitled ULTRA WIDEBAND COMMUNICATION SYSTEM WITH LOW NOISE PULSE FORMATION; application Ser. No. 09/685,195, filed Oct. 10, 2000, entitled ULTRA WIDE BANDWIDTH SYSTEM AND METHOD FOR FAST SYNCHRONIZATION; application Ser. No. 09/685,196, filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,202, filed Oct. 10, 2000, entitled METHOD AND SYSTEM FOR ENABLING DEVICE FUNCTIONS BASED ON DISTANCE FORMANCE; and application Ser. No. 09/685,201, filed Oct. 10, 2000, entitled CARRIERLESS ULTRA WIDEBAND WIRELESS SIGNALS FOR CONVEYING APPLICATION DATA, where each of the above-identified applications include at least one of J. McCorkle and T. Miller as an inventor, and the entire contents of each of the above-identified documents being incorporated herein by reference.

BACKGROUND OF THE INVENTION

1. Field of the Invention

The present invention relates to radio frequency communication receivers, systems, and methods employing ultra wide bandwidth (UWB) signaling techniques. UWB is a term of art meaning that the signal bandwidth is equal to 25% or more of the center frequency. More particularly, the present invention relates to UWB communication transceivers, receivers, systems, and methods configured to perform fast synchronization on an incoming UWB signal.

2. Discussion of the Background

In UWB communication systems, a transmitter embeds data in a signal that can propagate in a desired medium so that a receiver at a distant location can then extract information from the incoming signal. The transmitter clock and the receiver clock are usually not initially synchronized. However, in order to accurately extract the information from the incoming signal, the receiver clock should be synchronized with the incoming (received) signal. Fast synchronization is desirable because the faster the receiver is synchronized with the incoming signal, the faster the receiver achieves an acceptable quality of service, the higher the average throughput, and the lower the latency in the communicated data.

Many radios have some type of synchronization, also referred to as clock recovery, incorporated into the receiver. In narrowband communication systems, synchronization typically takes place by locking onto a carrier signal that is a narrowband tone, which can be isolated with a narrow band-pass filter. This form of operation (i.e. correlating with a sine wave via a narrowband filter) generally cannot be done in UWB systems because they are purposely designed not to emit any tones. Instead they send noise-like code sequences that appear like noise and mimic noise in standard narrowband receivers. As a result, synchronization is accomplished by correlating with the noise-like code sequence that was transmitted. Since a programmable real-time filter whose impulse response is a matched filter to the noise-like code sequence is difficult to build, a sliding correlator is typically used to acquire and track the signal. The sliding correlator is built by applying the noise-like sequence into a mixer/multiplier (e.g. the local oscillator LO port) and applying the received signal into the other port (i.e. the RF port), integrating the mixer output signal over the duration of the known noise code, and collecting a string of values comprised of the integration values. If the frequency of the clock used at the transmitter to encode the data does not precisely match the receiver clock frequency, then the two sequences (i.e. that applied to the RF port, and that provided to the LO port) at the receiver "slide" in phase (or time) relative to one another. At some point in time, the string of correlation values will peak to the largest absolute value, indicating that the two sequences are time (or phase) aligned. As they continue to slide in phase, a repeating pattern will result that is the cyclic autocorrelation function of the noise-like code sequence. Because the output of the sliding correlator is cyclic, the process of moving the phase of the receiver relative to the transmitter through one cycle is often referred to as a "code wheel spin." To guarantee that the largest absolute value of the correlation function is obtained, the code wheel must be allowed to spin at least one full cycle. In order to synchronize to the largest term, the receiver timing must have a mechanism to locate and then "lock onto" the largest peak by getting both the frequency and phase of its clock matched to the incoming signal. In the noiseless case, this mechanism can be simple and robust. But with real noise experienced by UWB receivers, the mechanism must be more complex and collect statistics in order to be robust.

Conventional UWB systems perform synchronization on an incoming signal modulated by pulse position modulation (PPM), where the temporal position of the pulses that constitute the incoming signal vary based on the data and the noise-like code sequence. Since the code sequence is long and spans many bits, and since the pulse repetition rate is slow (e.g. 10 MHz and lower), it takes a relatively long time to synchronize the receiver with the incoming signal.

UWB systems that use high chip rates (e.g. >1 GHz) to spread their spectrum, can cycle through a code of the same length much faster and thus synchronize faster. Nonetheless, the high sustained throughput requirements of newer applications such as streaming real-time video and multi-media in the context of multi-user networked systems causes there to be a need for faster synchronization so that more time is spent communicating data, and less time is spent synchronizing.

Most radios must operate in multipath environments. In multipath environments, more than one transmission path exists between the transmitter and receiver. Narrowband radios suffer in multipath environments due to the frequency selective nature of the phenomena. Narrowband radios can employ RAKE receiver structures to combine signals from the multiple paths, but this is a difficult and expensive process since narrowband systems lack the time-domain resolution to easily resolve the multipath terms.

By definition, UWB systems have high time-domain resolution, and thus can resolve the multipath signals. But the multipath signals lie within the modulation domain of UWB PPM systems, and the multipath environment can be unstable over the long coding periods of these systems.

High chip rate UWB systems have the advantage of operating in quasi-stationary multipath environments where the multipath is changing much slower than the code duration. In addition, UWB systems employing modulation schemes other than PPM do not have as much difficulty with multipath corruption of the modulation. Such systems are better suited to cope with multipath environments.

The challenge, as recognized by the present inventors, is to perform fast synchronization so as to quickly obtain acceptable signal quality, yet do it with high reliability and at a cost that is commensurate with extremely cost sensitive consumer electronics equipment.

SUMMARY OF THE INVENTION

Consistent with the title of this section, only a brief description of selected features of the present invention is presented. A more complete description of the present invention is the subject of this entire document.

An object of the present invention is to provide a method and a UWB communication system that includes a fast synchronization mechanism for quickly synchronizing one transceiver with another using the incoming UWB signal where synchronization is achieved in less than a full code wheel spin.

Another object of the present invention is to provide a method and system with a UWB receiver that includes a fast synchronization mechanism for rapidly recognizing and synchronizing with an incoming signal.

Another object of the present invention is to address the above-identified and other deficiencies of conventional UWB communication systems and methods.

These and other objects are accomplished by way of a UWB receiver or transceiver configured to receive UWB transmission schemes. An exemplary embodiment includes a UWB waveform correlator, a timing generator, and a controller wherein the controller examines the correlator outputs as the code wheel spins, and generates control signals to cause the timing generator to stop and track the incoming UWB signal whenever the incoming signal is received with sufficient signal-to-noise ratio to provide a predetermined quality of service such as bit-error rate (BER). This embodiment will determine when the receiver has been substantially synchronized with an incoming signal without an exhaustive search of the entire code-wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
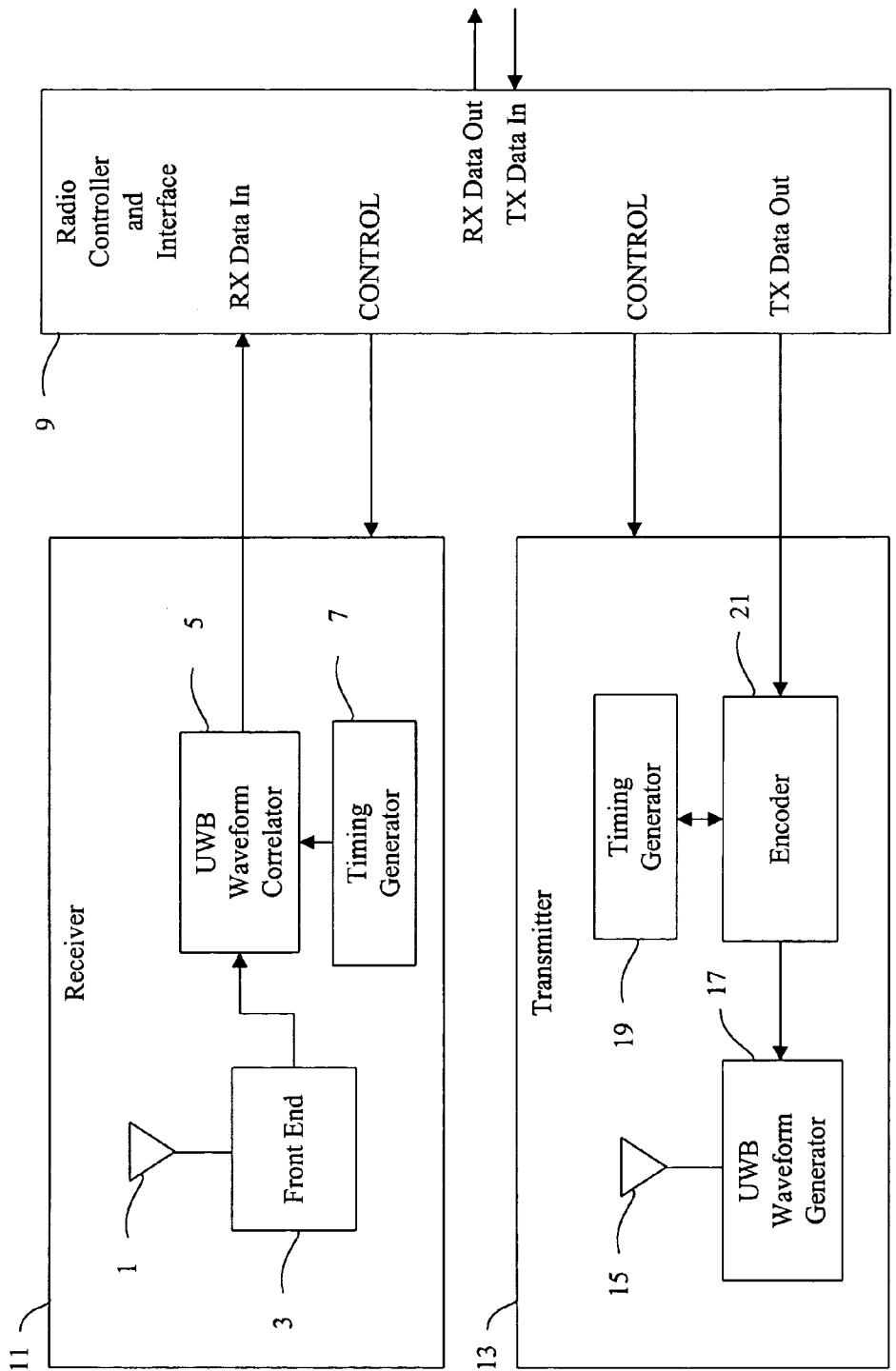
FIG. 1a is a block diagram of an ultra-wide band (UWB) transceiver, according to the present invention.

Referring now to the drawings, wherein like reference numerals designate identical or corresponding parts throughout the several views.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1,+a1, −a1, +a2, −a2, . . . , +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i$ exp(j2πβ/N)|$a_i \in \{1,$ a1, a2, . . . , aK\}, β∈\{0, 1, . . . , N−1\}), (vi) frequency modulated pulses, (vii) pulse position modulation (PPM) signals (possibly same shape pulse transmitted in different candidate time slots), (viii) M-ary modulated waveforms $g_{B_i}$(t) with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}$(t−$T_i$).

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \tag{2}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-(B_{i,2}t)^2} \right) \tag{3}$$

In the above equation, the function $\Psi(\ )$ normalizes the peak absolute value of $f_{B_i}$(t) to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2},B_{i,3},B_{i,4}} = f_{\omega_i,k_i,b_i}(t) = e^{-[b_i t]^2} \sin(\omega_i t + k_i t^2). \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{3*tr_i}}+1} - \frac{1}{e^{\frac{-(t-t2_i)}{3*tf_i}}+1} \right) \cdot \sin(\theta_i + \omega_i t + k_i t^2) \text{ where} \quad (5)$$

$$\{B_{i,2}, B_{i,3}, B_{i,4}, B_{i,5}, B_{i,6}, B_{i,7}, B_{i,8}\} = \{t1_i, t2_i, tr_i, tf_i, \theta_i, \omega_i, k_i\}$$

In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by θ, the starting frequency is controlled by ω, the chirp rate is controlled by k, and the stopping frequency is controlled by $\omega + kT_D$. An example assignment of parameter values is ω=1, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460) is that the parameters are chosen such that neither f nor h in Equation 2 above has a DC component, yet f and h exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
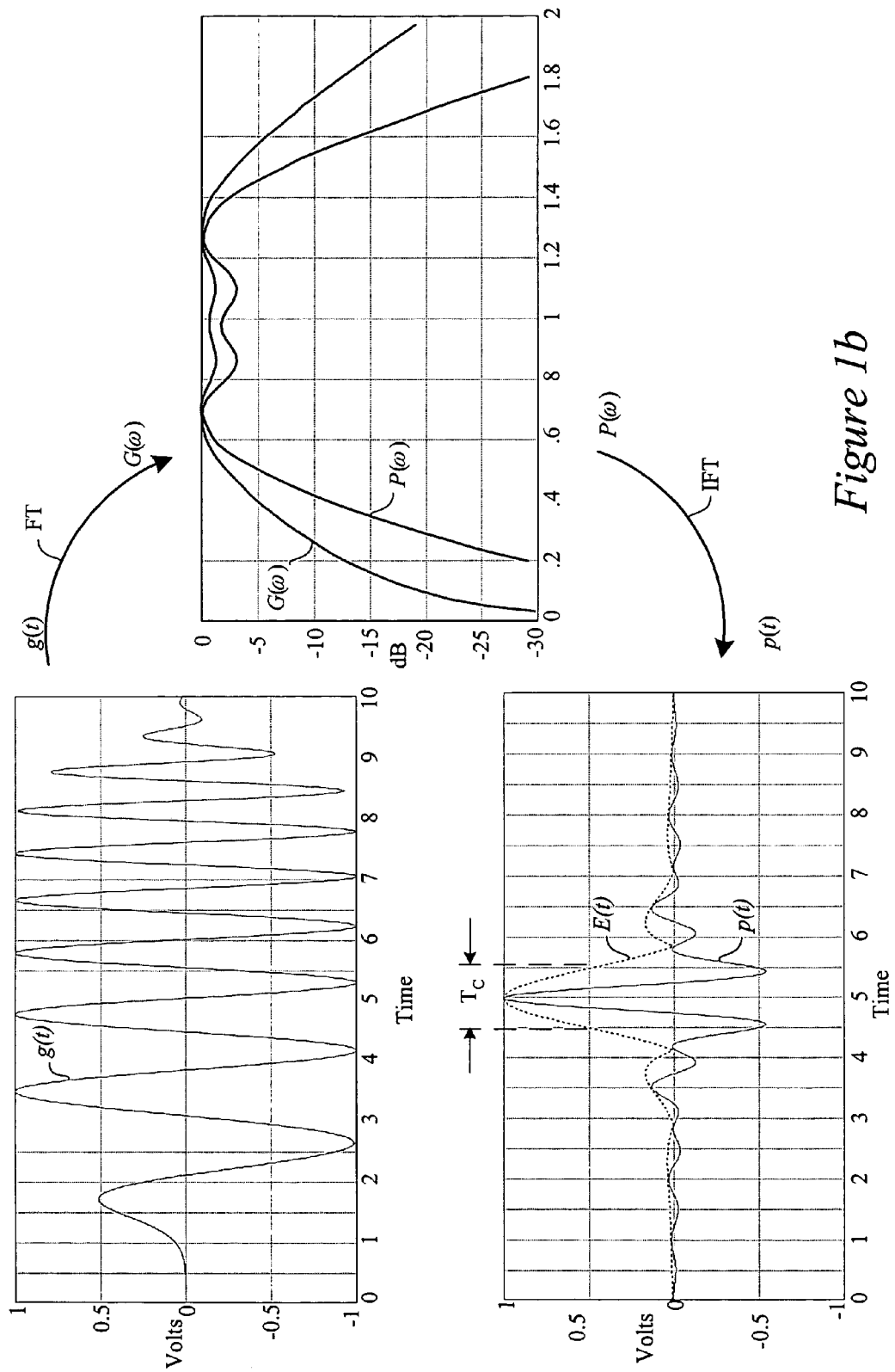
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G(ω). Accordingly, the matched filter is represented as G*(ω), the complex conjugate, so that the output of the matched filter is P(ω)=G(ω)·G*(ω). The output of the matched filter in the time domain is seen by performing an inverse Fourier transform (IFT) on P(ω) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
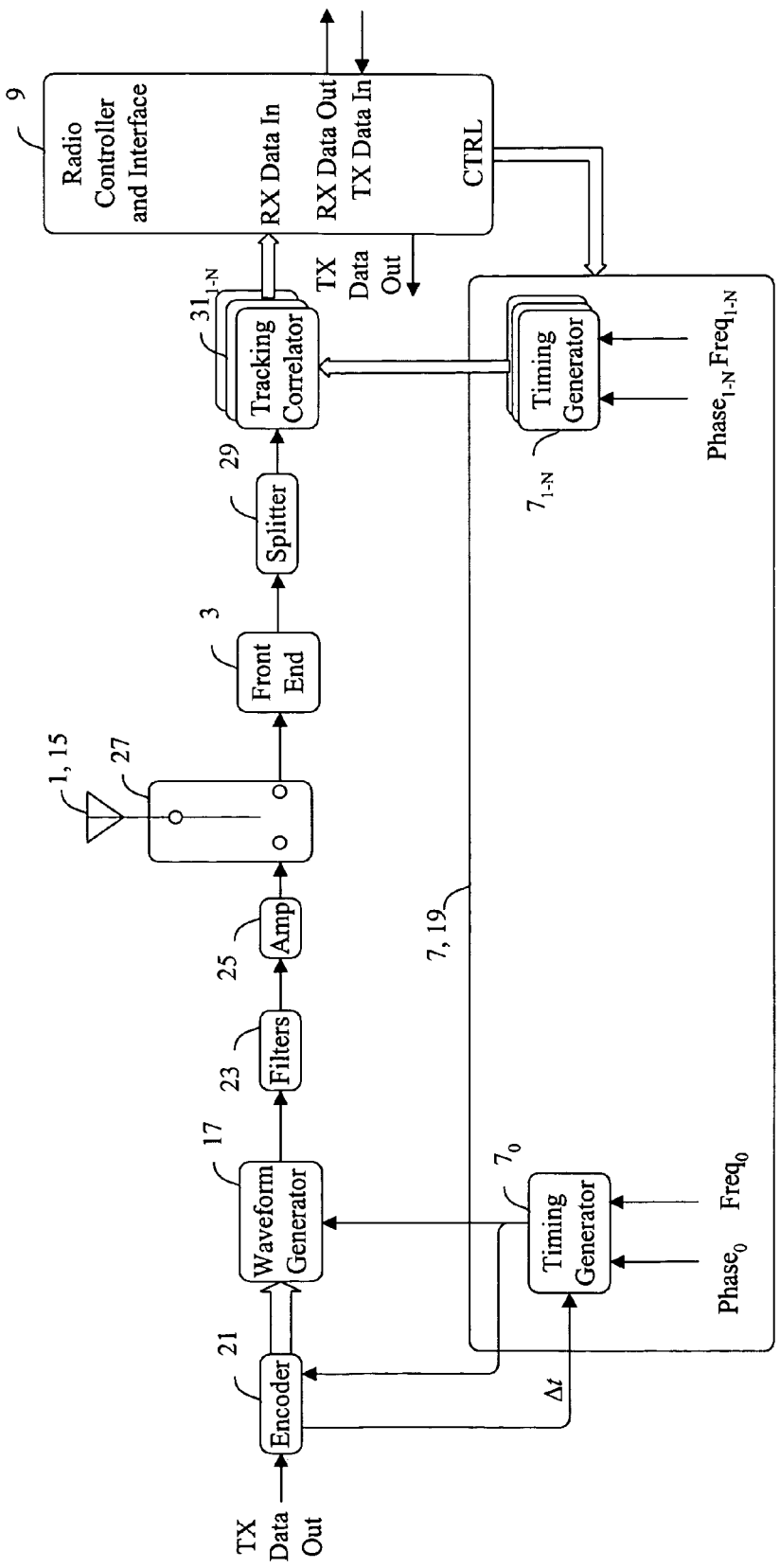
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., Δt) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator 70. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
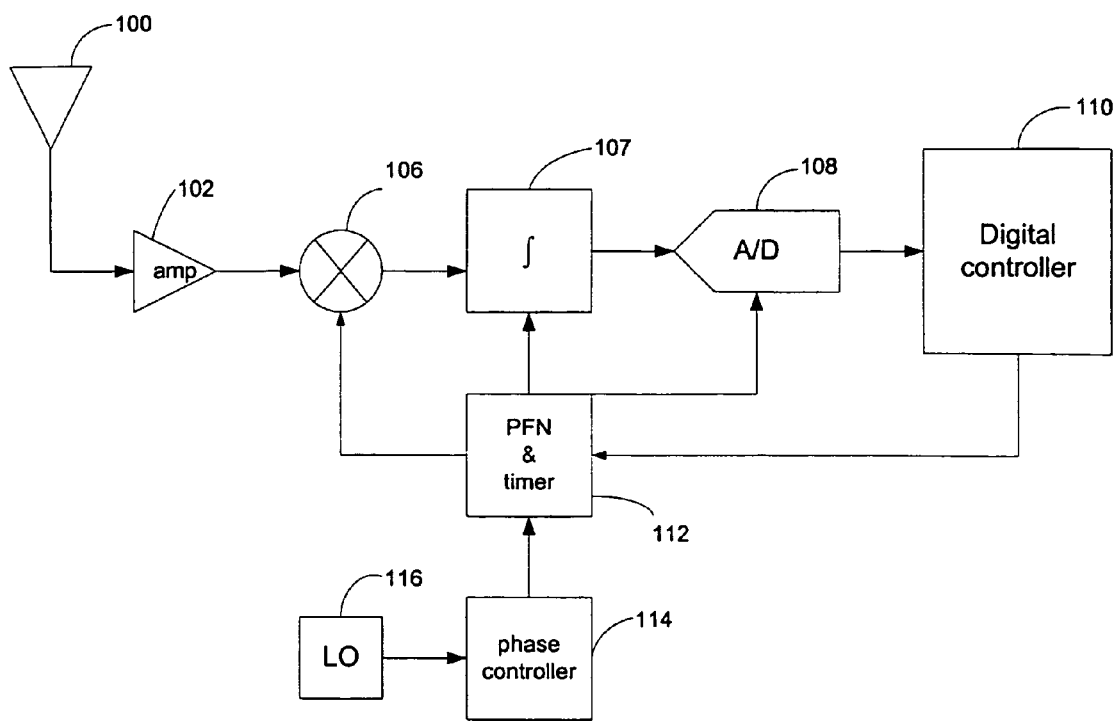
FIG. 3 is a block diagram of an exemplary UWB receiver of the present invention.

FIG. 3 is a block diagram of an exemplary UWB receiver according to the present invention. As compared with FIG. 2, only one tracking correlator arm is shown in FIG. 3 so as to simplify the discussion, however, it should be appreciated that the invention may be practiced with multiple tracking correlators, as shown in FIG. 2. In this example, amplifier 102 is disposed in the front end 3 of FIG. 1, mixer 106, integrator 107, and PFN 112 are disposed in UWB waveform correlator 5 of FIG. 1, local oscillator 116 and agile clock 114 are disposed in the agile clock 7 of FIG. 1, and A to D converter 108 and digital controller 110 may be included in radio controller and interface 9 of FIG. 1. In an exemplary UWB receiver of the present invention, an electromagnetic signal is transmitted over a radio channel to be received in the UWB receiver at antenna 100. After passing through antenna 100 and being converted into an electrical signal, the signal is amplified at amplifier 102. The incoming signal is then normalized to fall within a particular dynamic range via AGC (automatic gain control, such as a variable attenuator) 104 to produce an acceptable signal level. At pulse forming network (PFN) 112, a series of local pulses (e.g., square pulses or perhaps wavelets) are generated and multiplied with the incoming signal at mixer 106. Integrator 107 accumulates the mixer output over a predetermined period. The output is sampled at A to D converter 108 at a rate that corresponds to a source bit rate, such that there are a predetermined number of samples per bit, such as one sample per bit. The output of A to D converter 108 is provided to digital controller 110, where synchronization mode control is performed. The digital controller sends a control signal back to agile clock 114 as part of the synchronization process. The agile clock 114 acts in conjunction with local oscillator 116 to adjust the phase of the local pulse mixed with the incoming signal in mixer 106. PFN 112 sends a reset command to integrator 107 for each bit (if that is the selected accumulate period). PFN 112 also sends a clock command to A/D converter 108 to sample the output of integrator 107. Digital controller 110 monitors the strength of the signal from A/D converter 108 and sends instructions to AGC 104 to adjust the gain.

A mode controller in digital controller 110 determines if the receiver should be in acquisition or tracking mode based on the signal-to-noise ratio (SNR). Digital controller 110 sends a clock control signal back to the agile clock 114 as part of the synchronization process. If the SNR is less than a predetermined amount, the control signal adjusts the phase and/or frequency of the agile clock in an attempt to synchronize to, or accurately track the received signal. If the output signal quality from integrator 107 is consistently below a predetermined threshold, the mode controller places the system into acquisition mode, and digital controller 110 sends a signal to agile clock 114 to adjust the phase of the generated local pulse stream. The local pulse stream slides in phase until it is aligned in time with the incoming signal at mixer 106, hence, obtaining maximum correlation magnitude. The point at which maximum correlation occurs is determined by any of a variety of acquisition routines, as will be discussed. The local oscillator 116 provides a reference signal to the agile clock 114, which in turn provides a timing signal to the PFN 112 that produces a locally generated pulse stream that is mixed with the incoming signal at mixer 106.

Figure 4A:
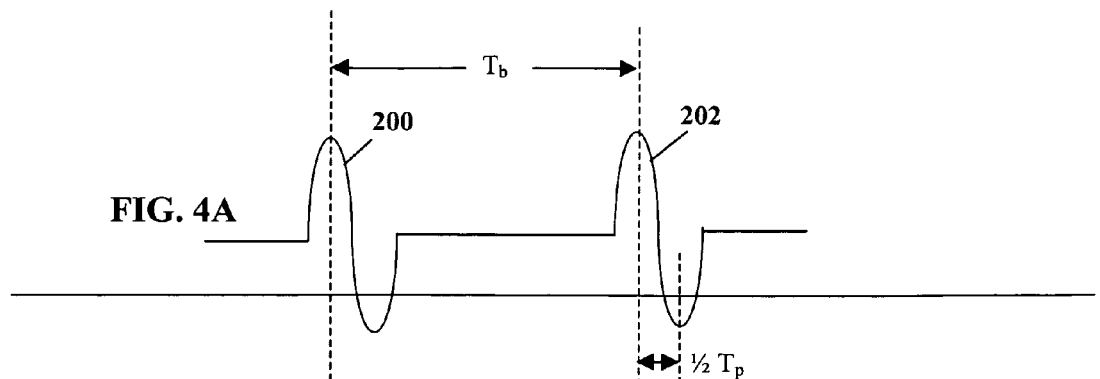
FIGS. 4A–C show a signal flow diagram of an incoming signal, a local pulse created at the receiver, and the correlation function of the incoming signal and the local pulse according to one embodiment of the present invention.
Figure 4B:
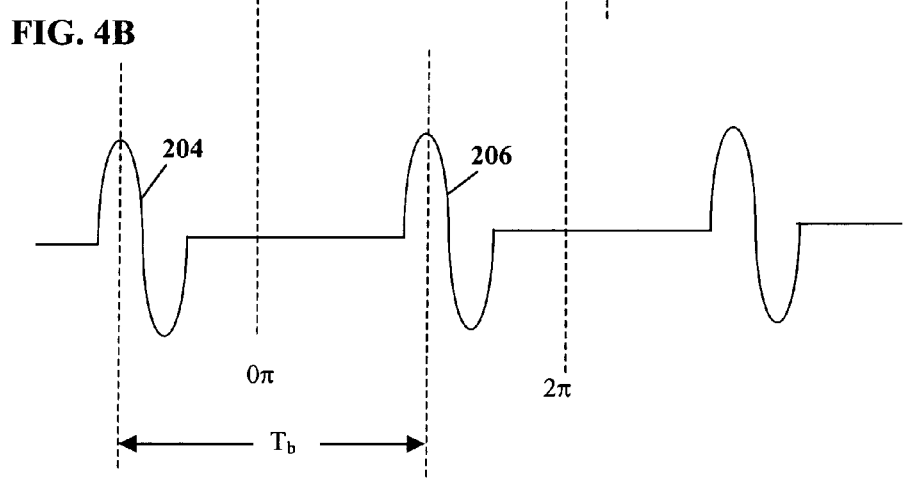
Figure 4C:
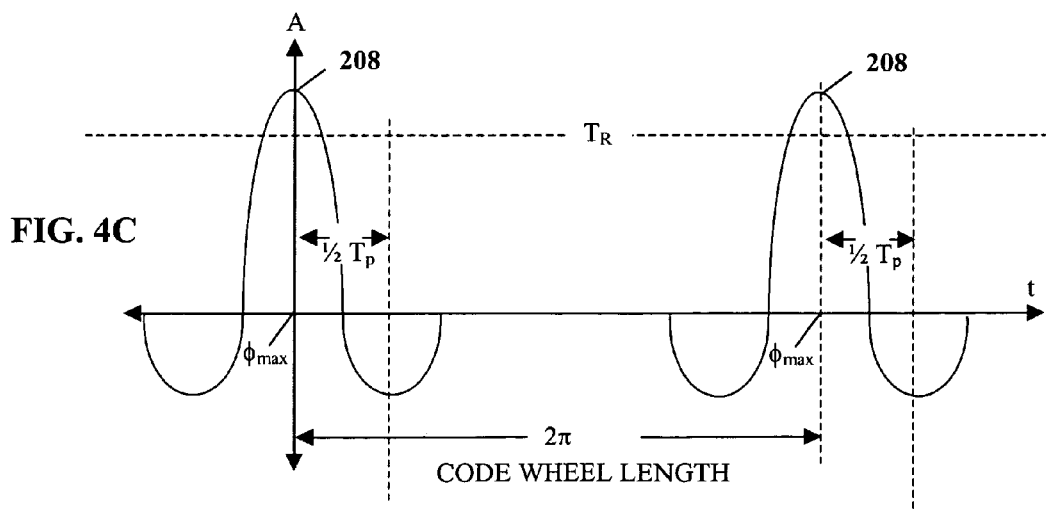

FIGS. 4A–4C show the signal flow diagram of the incoming signal, the local pulses created by PFN 112, and the resulting correlation function of the incoming signal with the local pulse according to the present invention. In FIG. 4A, incoming pulses 200 and 202 arrive at some fixed clock interval called $T_b$. $T_b$ is 10 nanoseconds, for example. In FIG. 4B, the locally generated pulses 204 and 206 are similar to the incoming pulses. There is maximum correlation at integrator 107 when the two signals are perfectly phase aligned. Initially, it is not known whether the two signals are aligned (synchronized) with each other. Thus, the local pulses created in PFN 112 may be positioned between the pulses of the incoming signal as shown in FIGS. 4A and 4B. As a result, the magnitude of the output of integrator 107 is small. In other words, the signals have a small correlation result. So, in order to maximize correlation, the phase of agile clock 114 attached to PFN 112 is varied under control of the digital controller 110 until locally generated pulses are in phase with the incoming signal at mixer 106. If the output from integrator 107 is not maximized, then digital controller 110 sends a signal to agile clock 114 to adjust the phase of the locally generated pulses. As such, the local pulses slide in phase until they are aligned (synchronized) with the incoming pulse train at mixer 106 and hence maximum correlation is achieved.

FIG. 4C shows the correlation result of the incoming signal with the locally generated pulses as a function of time (or phase, since the phase is scanned), as well as an illustrative exemplary magnitude threshold $T_R$ that can be used to identify specific portions of the correlation function. Note, for clarity of illustration, it is assumed in FIG. 4C that the incoming data stream consists of all ones. Bi-phase modulated data would not affect the discussion. As can be seen at point 208, when the signals are perfectly phase aligned, the correlation is at a maximum. Furthermore, point 208 along with neighboring portions of the correlation is above exemplary magnitude threshold $T_R$. Essentially, the correlation function is examined over a given time (or phase) until the portions of the correlation above the exemplary magnitude threshold $T_R$ are found. At phases where the correlation is above exemplary magnitude threshold $T_R$, the receiver can be considered synchronized to the incoming signal.

Figure 5:
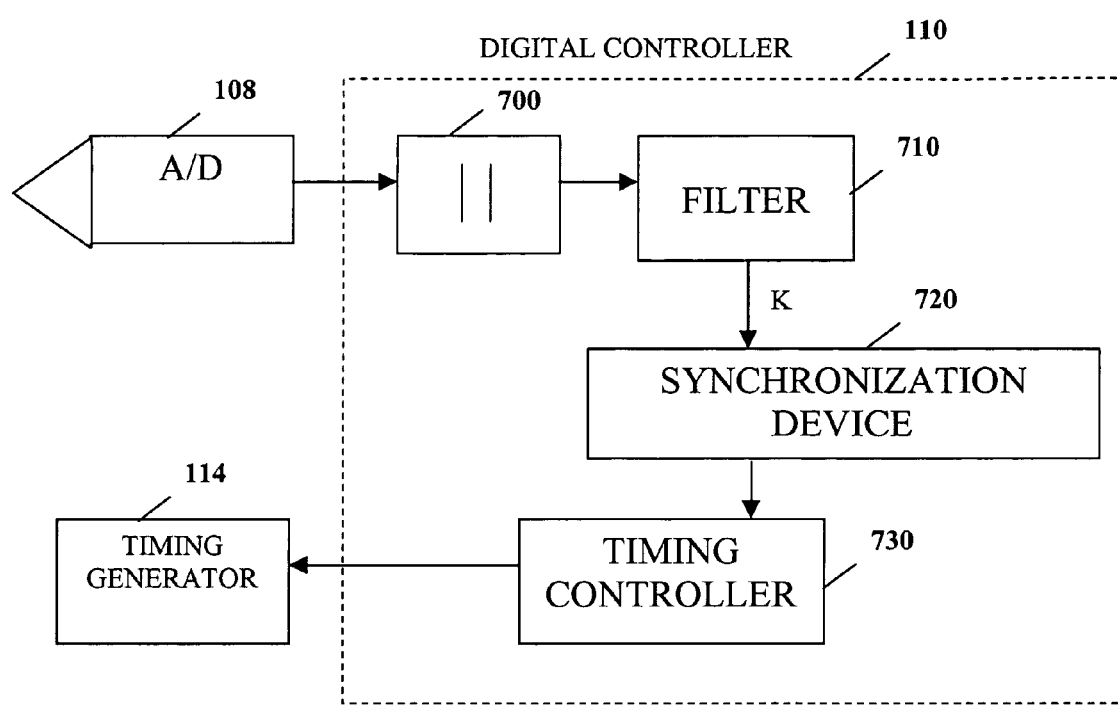
FIG. 5 is a block diagram of exemplary processing steps employed in acquiring and maintaining synchronization within a digital controller.

FIG. 5 shows the processing blocks employed within digital controller 110 of a receiver to acquire synchronization with the received pulse stream. The incoming samples from the A/D converter 108 in FIG. 3 are passed to absolute value block 700 in digital controller 110. The absolute value block computes the absolute value of the input sample and passes the new value to filter block 710. Filter block 710 filters the incoming sequence of absolute values as a method of reducing noise. This filter could be any one a number of digital filters employed for these purposes, including but not limited to: all-pass filters, integrators, leaky integrators, box-car filters, other lowpass or bandpass finite impulse response filters, or lowpass or bandpass infinite impulse response filters. A complete description of these and other digital filters is given by Openheim and Shafer in *Digital Signal Processing*, the entire contents of which are incorporated herein by reference. The output of filter block 710 will be referred to as correlation value K. Correlation value K is passed into the synchronization algorithm block 720. The contents of synchronization algorithm block 720 are discussed below. Based upon information from synchronization algorithm block 720, timing controller block 730 sends commands out of the digital controller 110 to the agile clock 114.

The code wheel is a representation of the user code with which the incoming data is coded. The code wheel can be visualized as a circular device containing the chips that make up the user code, where each chip is distributed at a fixed interval relative to its nearest neighbor around the code wheel from 0 to $2\pi$. Then, the interval between each chip is $2\pi/n$, where n is the number of chips in the code. One "rotation" of the code wheel, $2\pi$, is equivalent to the bit period $T_b$ shown in FIG. 4A. So, through a "rotation," the phase of the local pulses from PFN 112 is adjusted such that the entire correlation function is generated. As such, when the incoming pulses are aligned with the locally generated pulses, a code wheel turn through one chip in the code ($2\pi/n$) is identical to a phase shift between adjacent pulses of the incoming signal. Methods of moving the phase of the locally generated pulses relative to the received pulse train is the subject of application Ser. No. 09/685,197, filed Oct. 10, 2000, entitled ULTRA WIDEBAND COMMUNICATION SYSTEM WITH LOW NOISE PULSE FORMATION the entire contents of which are incorporated herein by reference.

Figure 6:
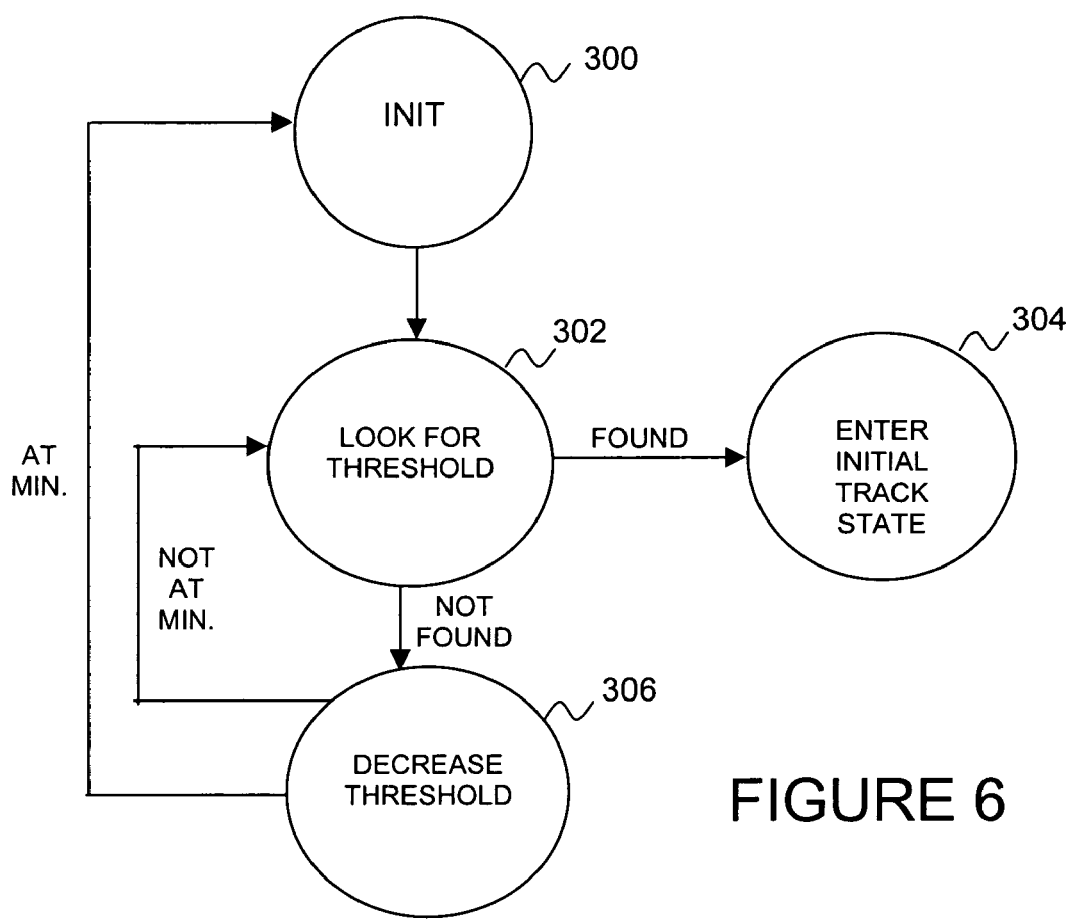
FIG. 6 is a state diagram of one embodiment for fast synchronization according to one embodiment of the present invention that compares the correlation of FIG. 4C with a threshold value.

FIG. 6 is a state diagram of the fast synchronization state machine according to the present invention that finds the portions of the correlation above exemplary magnitude threshold $T_R$ of FIG. 4C, or portions of the correlation where one or more computed parameters relating to bit error rate (BER) are greater than another threshold. The state machine is initialized in state 300. Then, portions of the correlation above exemplary magnitude threshold $T_R$ (or portions of the correlation result where one or more computed parameters relating to bit error rate are greater than another threshold)

are sought in state 302. When a portion of the correlation result (or function) is found to be above an exemplary magnitude threshold $T_R$ (or a portion of the correlation where one or more computed parameters relating to bit error rate are greater than another threshold), the state machine then operates at the identified portion of the correlation result in state 304 where tracking begins.

However, if the threshold is not exceeded by any portion of the correlation result over an entire code wheel spin, then the state machine transitions to state 306 and decreases the value of the exemplary magnitude threshold $T_R$ (or the bit error rate threshold). Once the exemplary magnitude threshold $T_R$ (or the bit error rate threshold) is decreased, the state machine can transition back to state 302, and again look for a portion of the correlation function above a reduced exemplary magnitude threshold $T_R$ (or the bit error rate threshold). In one embodiment, several iterations of decreasing the threshold as in state 306 and looking for a portion of the correlation function above the current threshold in state 302 can be repeated, until the threshold is finally decreased below a minimum threshold. This minimum threshold can, for example, be a predetermined value related to the minimum signal-to-noise ratio at which acceptable device operation is achieved. Once the exemplary magnitude threshold $T_R$ (or the bit error rate threshold) has been decreased to (or alternatively, gone beyond) this minimum threshold, the state machine returns to state 300, where the machine is reinitialized.

After phase acquisition, the received signal may be tracked as a means of maintaining synchronization as in step 304 of FIG. 6. This can be done by methods described in, for example, co-pending U.S. patent application entitled "ULTRAWIDE BANDWIDTH SYSTEM AND METHOD FOR FAST SYNCHRONIZATION," Ser. No. 09/685,195, filed concurrently with the present document and having common inventorship as with the present document, the contents of which being incorporated herein by reference. As discussed in the above referenced co-pending patent, many embodiments for performing phase tracking are possible in the current invention. These tracking methods may employ more than one mixer, or just the on-time term from a single mixer as illustrated in the embodiments of the above referenced co-pending patent. During the process of tracking incremental phase errors, a method may be employed for making frequency adjustments to the timing generator 7 in FIG. 1A. Various embodiments involving frequency acquisition are possible as discussed in the above co-pending patent.

Figure 7:
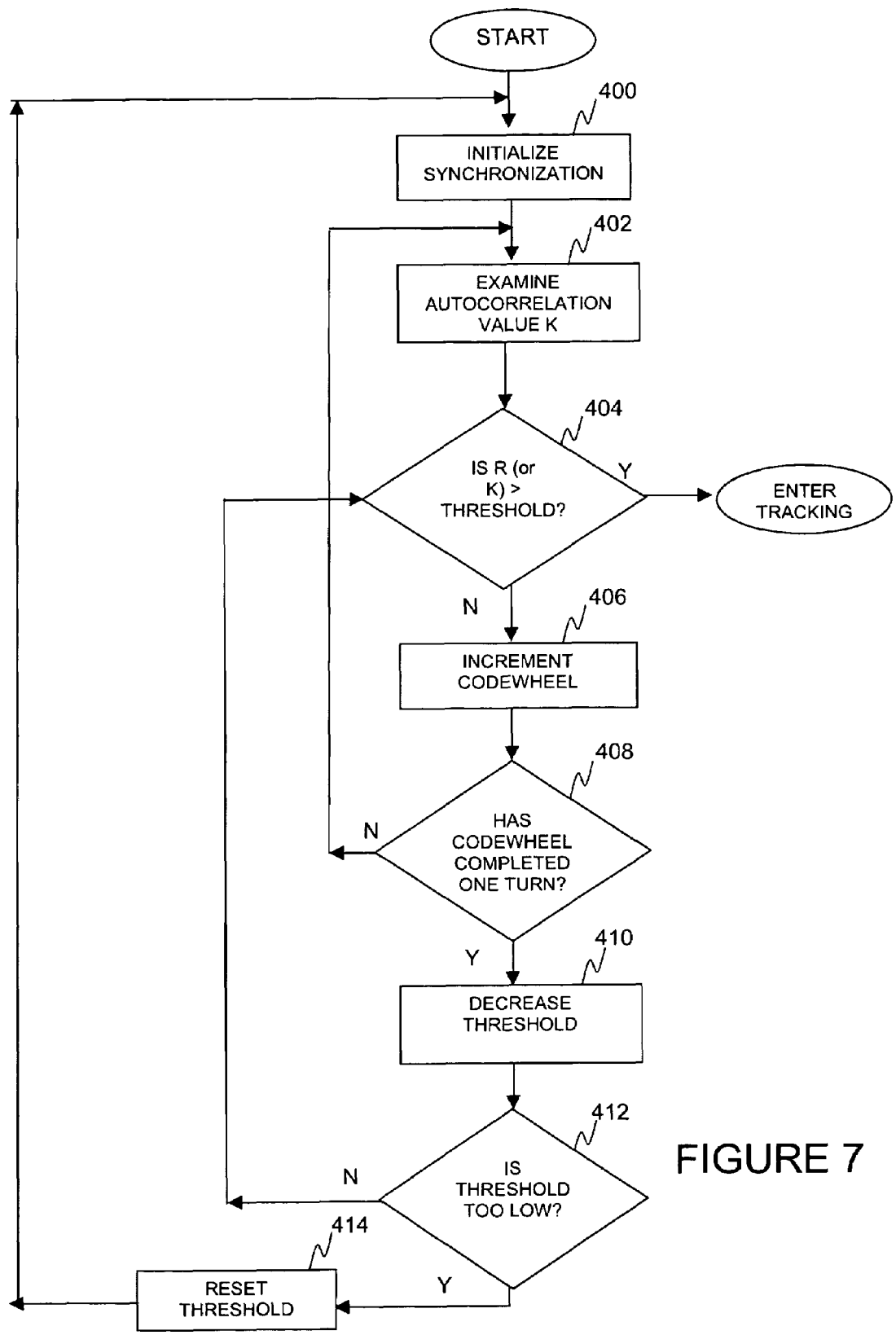
FIG. 7 is a flowchart of a synchronization process performed by the embodiment of FIG. 6.

FIG. 7 is a flow chart outlining the steps performed by the exemplary embodiment of FIG. 5. In step 400, the threshold is at its maximum value, and the code wheel is initially set to zero phase, i.e., with no phase adjustment. Alternatively, the code wheel could be set to any desired initial phase offset, as is the case for any of the embodiments described below. A correlation value K is examined in step 402. Optionally, a parameter R based upon the value K and related to BER may also be computed in step 402. In step 404, an inquiry is made as to whether the correlation value K is greater than the current exemplary magnitude threshold $T_R$ (or if a parameter R related to BER is greater than another threshold). If so, then the received signal is sufficiently strong to allow extraction of the transmitted information at the current phase setting of the code wheel, and the acquisition process flow stops and tracking begins.

On the other hand, if the correlation value K is determined to be less than the current exemplary magnitude threshold $T_R$ (or if a parameter R related to BER is not greater than another threshold), then the code wheel is incremented in step 406. In other words, the phase of the locally generated pulse train is shifted by a predetermined angle on the code wheel that is considerably less than the angle between adjacent chips. In step 408, a determination is made as to whether or not the code wheel has completed one turn (i.e., has the phase of the locally generated pulse train been scanned through $2\pi$ radians?). If the code wheel has not completed one turn, then the process flow returns to step 402 and a new correlation value K and a new parameter value R are determined.

However, if it is determined in step 408 that the code wheel has completed one turn (i.e., the phase of the locally generated pulse train has been scanned through $2\pi$ radians), then the process flow proceeds to step 410 where the exemplary magnitude threshold $T_R$ (or the BER threshold) is decreased by a predetermined amount. After the threshold has been decreased, a determination is made in step 412 as to whether the exemplary magnitude threshold $T_R$ (or the BER threshold) is below a predetermined minimum threshold value. If not, the code wheel is considered "reset" at an initial phase shift and the process flow returns to step 404. Since the code wheel is considered "reset" in step 412, the code wheel can shift the phase through another $2\pi$ radians before step 408 again determines that the code wheel has completed a full turn.

However, if it is determined in step 412 that the threshold has been decreased below a point where an acceptable signal-to-noise ratio is achievable for a given receiver, then the process flow proceeds to step 414 where the exemplary magnitude threshold $T_R$ (or the BER threshold) is reset to the original, maximum threshold. The process flow then proceeds to step 400, where synchronization is initialized and the entire process repeated until an acceptable correlation value K is reached.

The process outlined in FIGS. 6 and 7 seeks an operation point that meets a minimum quality of service requirement. Thus, it is not guaranteed that the optimal phase location will be found. It is possible that a code sidelobe or a multipath term will satisfy the performance requirement.

Figure 8:
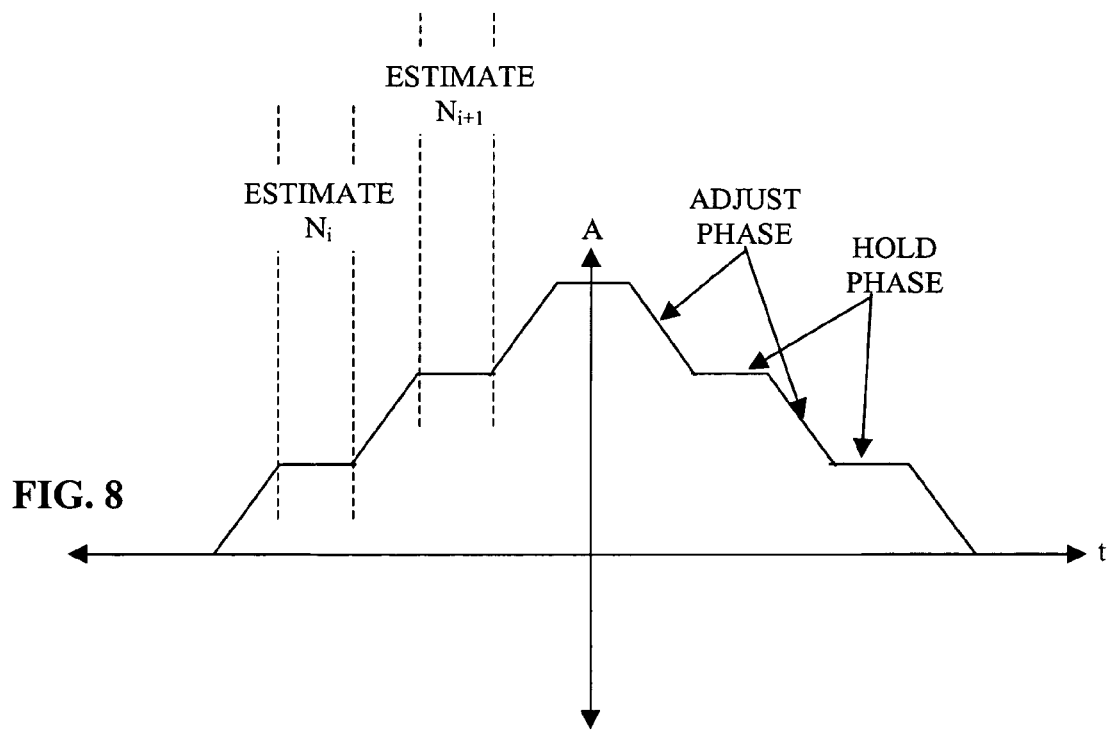
FIG. 8 is an exemplary correlation function derived by repeatedly sweeping the phase for a period of time and then holding the phase constant for a period of time.

During a code wheel turn, the phase of the local pulse train is scanned from 0 to $2\pi$. The method of scanning the phase can have various embodiments. In FIG. 8, the magnitude of an exemplary correlation result is presented as a function of time (and phase, since phase is scanned), where the phase of the locally generated pulse train is repeatedly changed relative to the input pulse sequence for a period of time and then held constant for a period of time. The plateaus indicate time periods when the phase is held constant. Of course this is a hypothetical example in which there is no noticeable frequency drift between the transmitter and receiver. The sloped portions of the curve indicate time periods over which the phase is changing. During periods of constant phase, statistics such as mean absolute correlation value and noise variance can be calculated as a method of determining if the local pulse train is locked to the incoming signal at the present phase. As illustrated, the maximum of the curve occurs on the highest plateau, although this is not necessarily the case in all scans. Furthermore, the curve appears to increase linearly between plateaus. This, too, is for illustrative purposes only. The scan and hold process can be repeated over the entire rotation of the code wheel from 0 to $2\pi$ radians (not shown), or it can be performed over a limited phase range for sub-code wheel spins. Although FIG. 8 illustrates a piecewise continuous scan through the correlation function, the correlation function is computed only at discreet phases.

Figure 9:
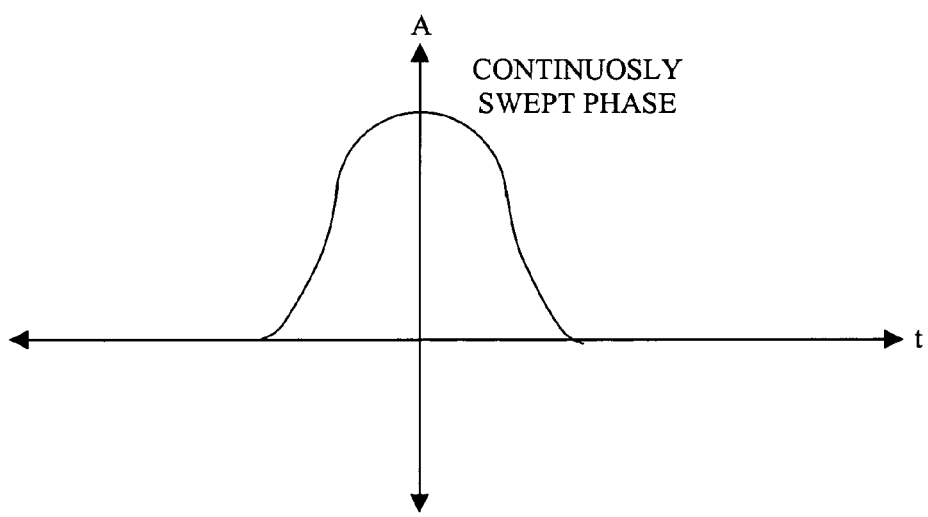
FIG. 9 is another exemplary correlation function in which the phase is continuously swept.

In FIG. 9, the magnitude of an exemplary correlation result is presented as a function of time (and phase, since phase is scanned), where the phase of the locally generated pulse train is repeatedly changed relative to the input pulse sequence over a complete phase range (from zero to $2\pi$ radians) or a limited (<$2\pi$ radians) phase range for sub-code wheel spins. The correlation result displayed in FIG. 8 is an abbreviated version of the complete phase range correlation illustrated in FIG. 4C. For example, the negative portions of the correlation in FIG. 4C are omitted since they lie outside the scan range. Although FIG. 8 illustrates a piecewise continuous scan through the correlation function, the correlation function is computed only at discreet phases.

As discussed in regard to the illustrative examples of FIGS. 4A, 4B, and 4C, synchronization through correlation of the received pulse train with a locally generated pulse train can include correlating over the entire range of phases (i.e., from zero to $2\pi$ radians). At some phase angle $\phi_{max}$, the correlation between the received pulse train and the locally generated pulse train is a maximum (208), and if the signal-to-noise ratio is sufficiently high, then some portion of the correlation result is above a magnitude threshold $T_R$ and/or the bit-error-rate threshold.

Figures 10A, 10B, 10C, 10D:
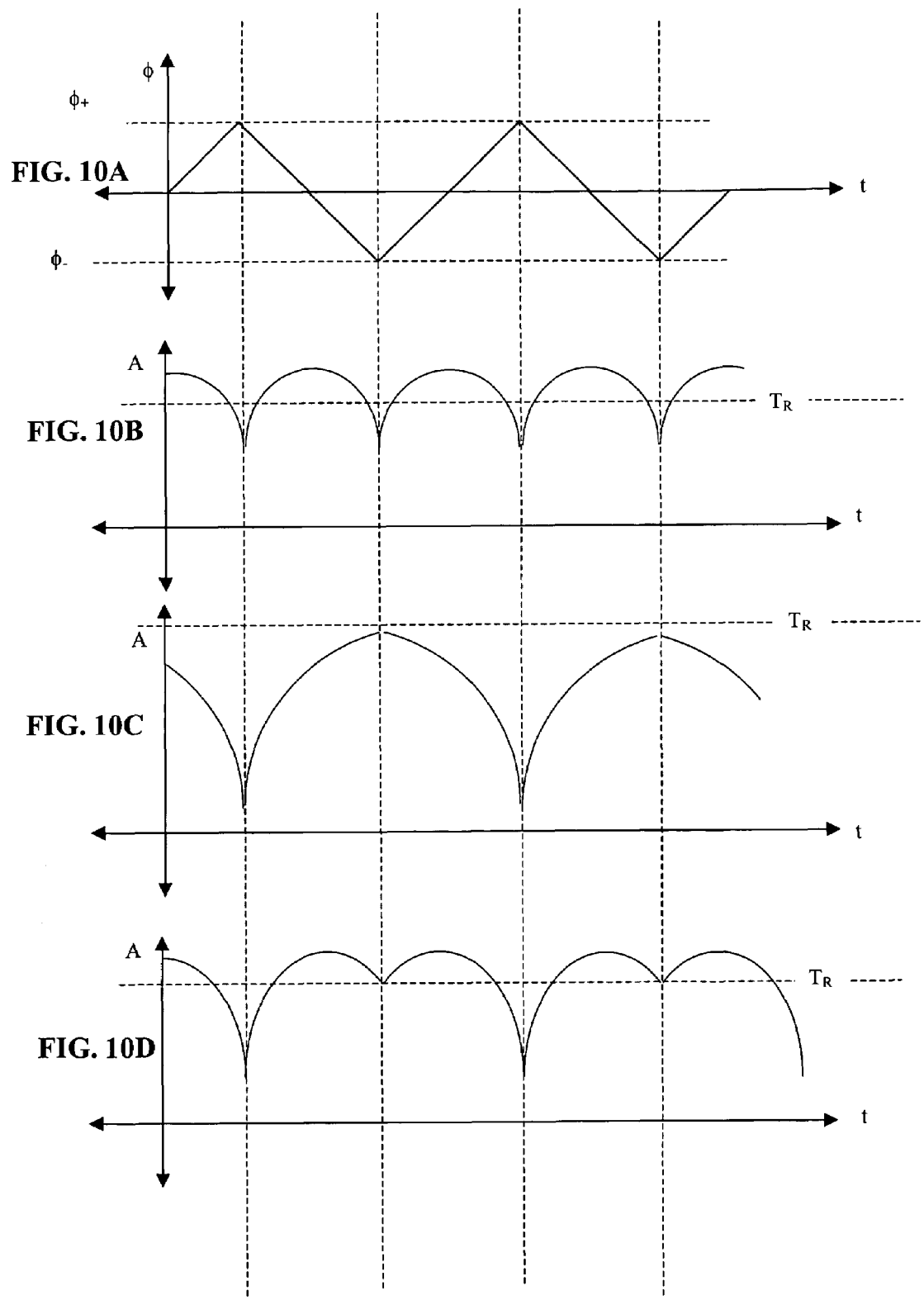
FIGS. 10A–D show a phase scan as a function of time, and potential resulting correlation functions of the incoming signal and the local pulse according to one embodiment of the present invention.

Another method, according to the present invention, for synchronization through correlation involves correlating the received pulse train with a locally generated pulse train over a limited range (<$2\pi$) of phases. This method is particularly useful during tracking of the received pulse after the initial acquisition, as small changes in the phase of the received pulse may arise, for example, due to changes in the position of the transmitter relative to the receiver or changes in the temperature of the transmitter and/or receiver causing the oscillators to drift. FIG. 10A illustrates a potential phase scan over time between a maximum phase angle $\phi_+$ and a minimum phase angle $\psi_-$ where $\phi_+-\phi_-<2\pi$. As illustrated in FIG. 10A, the scan is linear, although other embodiments, such as a sinusoidal phase scan, are within the scope of the present invention. Although the phase scan is drawn as piece-wise continuous, it may be that only discreet phases are employed over the illustrated range. Illustrative examples of correlations between received and locally generated pulse trains over this phase scan are provided in FIGS. 10B, 10C, and 10D, respectively, along with an exemplary magnitude threshold $T_R$. FIGS. 10B, 10C, and 10D are illustrated examples only, and other forms of both phase scans and the resulting correlations are possible according to the present invention.

FIG. 10B illustrates a correlation result over a phase angle <$2\pi$ between the received and locally generated pulse trains when a phase scan such as that illustrated in FIG. 10A is substantially centered about the phase angle that provides the maximum correlation value, namely $\phi_{max}$ illustrated in FIG. 4C. In other words, the phase is scanned between the maximum phase angle $\phi_+$ and the minimum phase angle $\phi_-$ through the phase angle $\phi_{max}$ that provides the maximum correlation value such that $\phi_+-\phi_{max}$ is approximately equal to $\phi_{max}-\phi_-$. The resulting correlation as a function of time (and phase, since phase is scanned) presented in FIG. 10B thus includes the maximum 208, as illustrated in FIG. 4C, as well as the correlation values immediately surrounding the maximum 208, some of which are above the exemplary magnitude threshold $T_R$ in FIG. 10B.

FIG. 10C illustrates a correlation result over a phase angle <$2\pi$ when a phase scan such as that illustrated in FIG. 10A is substantially centered on the rising portion of the correlation. As illustrated in FIGS. 4A and 4C, the phase angle between the received and locally generated pulse trains is within +/-½ $T_p$ of the phase angle $\phi_{max}$ that provides the maximum correlation value, where $T_p$ is the peak-to-peak pulse width of the illustrative pulse. The slope, concavity, RMS value, and phase (for example) of the function illustrated in FIG. 10C will change depending upon where the maximum phase angle $\phi_+$ and the minimum phase angle $\phi_-$ are located within the range of +/-½ $T_p$ of the phase angle $\phi_{max}$ that provides the maximum correlation value. Nevertheless, certain characteristics of this illustrated correlation can be used to identify the position of the phase scan relative to phase angle $\phi_{max}$ that provides the maximum correlation value. For example, the illustrated correlation result fails to rise above the exemplary magnitude threshold $T_R$, indicating that an adequately high signal-to-noise ratio is not present over this portion of the scanned phase range.

FIG. 10D illustrates a correlation result over a phase angle <$2\pi$ between the received and locally generated pulse trains when a phase scan such as illustrated in FIG. 10A contains the phase angle $\phi_{max}$ that provides the maximum value of the correlation, but is not centered thereupon. Once again, the slope, RMS value, and phase (for example) of the function illustrated in FIG. 10D will change depending upon where the maximum phase angle $\phi_+$ and the minimum phase angle $\phi_-$ are located relative to the phase angle $\phi_{max}$ that provides the maximum correlation value.

There are several different methods for distinguishing the functions illustrated in FIGS. 10B, 10C, and 10D that can be used to identify the phase angle $\phi_{max}$ max that provides the maximum correlation magnitude. The distinguishing characteristics can be used, e.g., by the synchronization algorithm 720 in FIG. 5 to provide a control signal to the agile clock 114 of FIG. 3 for synchronizing the locally generated pulse train with a received pulse train. Available methods for distinguishing these functions include, but are not limited to, determining which portions of the correlation result are above the exemplary magnitude threshold $T_R$, determining if the RMS value of the correlation is above the exemplary magnitude threshold $T_R$, determining if the AC peak-to-peak value of the correlation is below a certain threshold, determining if one or more parameters related to the bit-error-rate are above a threshold, and determining if the spectral content of the correlation is above or below a predetermined threshold (e.g., the correlation illustrated in FIG. 10B has a ratio of spectral power density of the second harmonic to the fundamental frequency that is higher than some threshold value, where the fundamental frequency has the periodicity of the phase scan illustrated in FIG. 10A). Regardless of how a control signal based upon the correlation between the received and locally-generated pulse trains is obtained, it can be used to synchronize the pulse trains and provide and/or maintain UWB communications using a predetermined threshold, such as the exemplary magnitude threshold $T_R$. In addition, the correlation derived control signal drives the phase scan range to be centered about $\phi_{max}$.

Figure 11:
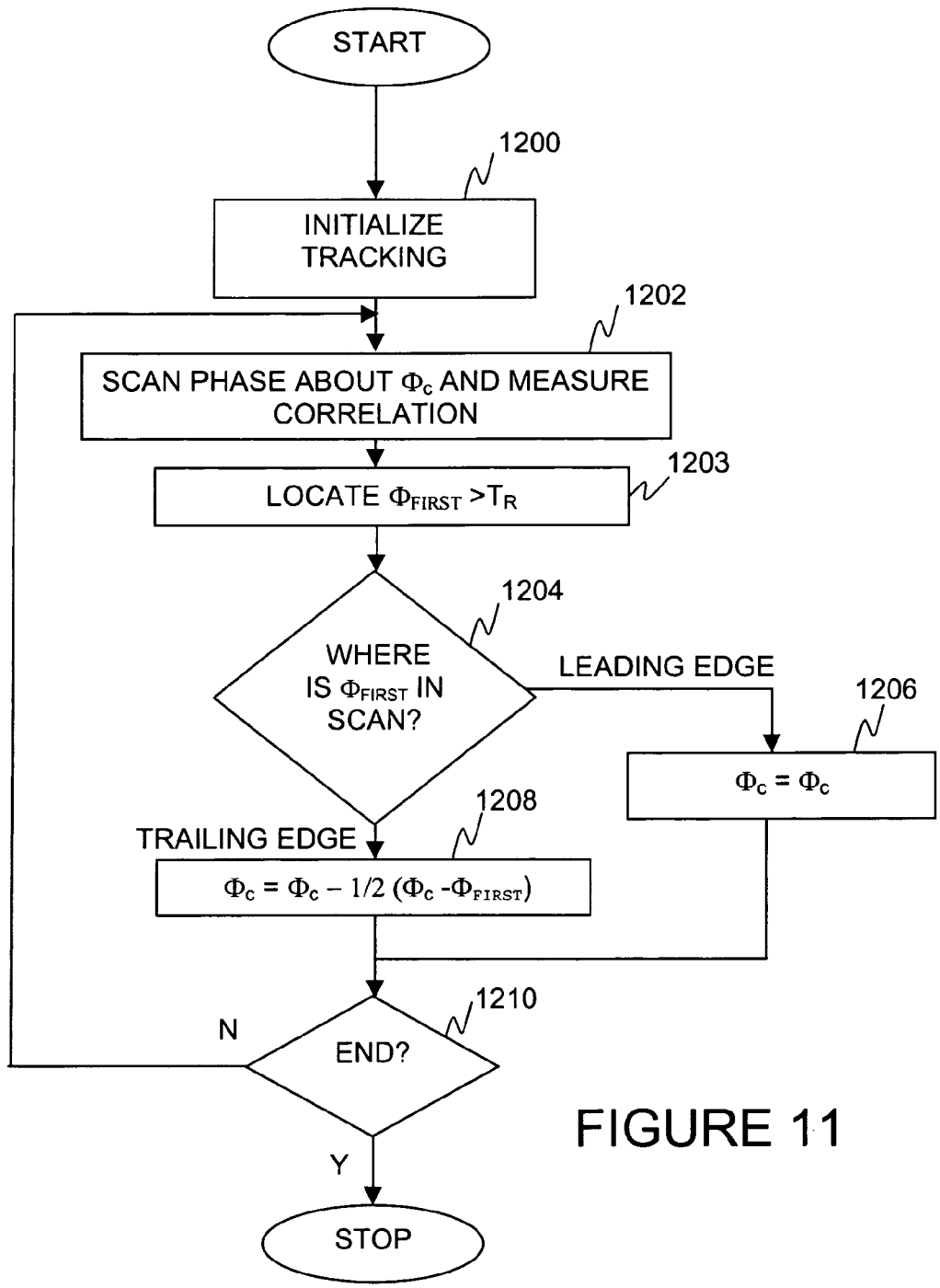
FIG. 11 is a flowchart of an embodiment of a process for tracking a received pulse train after correlating over a limited phase range scan.

FIG. 11 shows the flowchart of an embodiment of a process for tracking a received pulse train after correlating over a limited phase range. After tracking has been initialized in step 1200, the phase is scanned in step 1202 about a center phase angle $\phi_c$ (commonly midway between the maximum phase angle $\phi_+$ and the minimum phase angle $\phi_-$ as in FIG. 10A) and the correlation between the phase swept locally generated pulse train and the received pulse train is determined. In step 1203, the first phase angle $\phi_{FIRST}$ of the correlation result that yields a correlation value greater than an exemplary magnitude threshold $T_R$ (or a bit error rate above another predetermined threshold) is determined, and in step 1204 the position of phase angle $\phi_{FIRST}$ relative to the center phase angle $\phi_c$ is determined. If $\phi_{FIRST}$ is located at or near the leading edge of the scanned phase range (for example, is $\phi_-$ and center phase angle $\phi_c$), then the center phase angle $\phi_c$ is maintained at it's current value, as illustrated in step 1206. However, if $\phi_{FIRST}$ is located at or near the trailing edge of the scanned phase range (for example, is between center phase angle $\phi_c$ and $\phi_+$), then the center phase angle $\phi_c$ is shifted to a new value, as illustrated in step 1208. In the illustrated embodiment, the phase shift is one half the difference between the center phase angle $\phi_c$ and phase angle $\phi_{FIRST}$, and thus the new center phase angle $\phi_c$ is set to the phase angle intermediate between the old center phase angle $\phi_c$ and the phase angle $\phi_{FIRST}$. This is a form of averaging that will, in effect, damp out large swings in the center phase angle $\phi_c$ that may arise spuriously, e.g., due to noise. Naturally, other weighting coefficients can be used, and shifting the center phase angle can be performed when phase angle $\phi_{FIRST}$ is trailing as well. Other known forms of averaging and/or signal processing may be used, including but not limited to boxcar averaging, weighted boxcar averaging, curvefitting, and other methods of preparing one or more periods of the correlation function for analysis as given by Openheim and Shafer in *Digital Signal Processing*, the entire contents of which are incorporated herein by reference. In step 1210, it is determined if the user (or controller) wishes to and/or can maintain synchronization with the received signal. If the synchronization is not going to end, then the process flow returns to step 1202, and another scan about the new center phase angle $\phi_c$ is performed.

Figure 12:
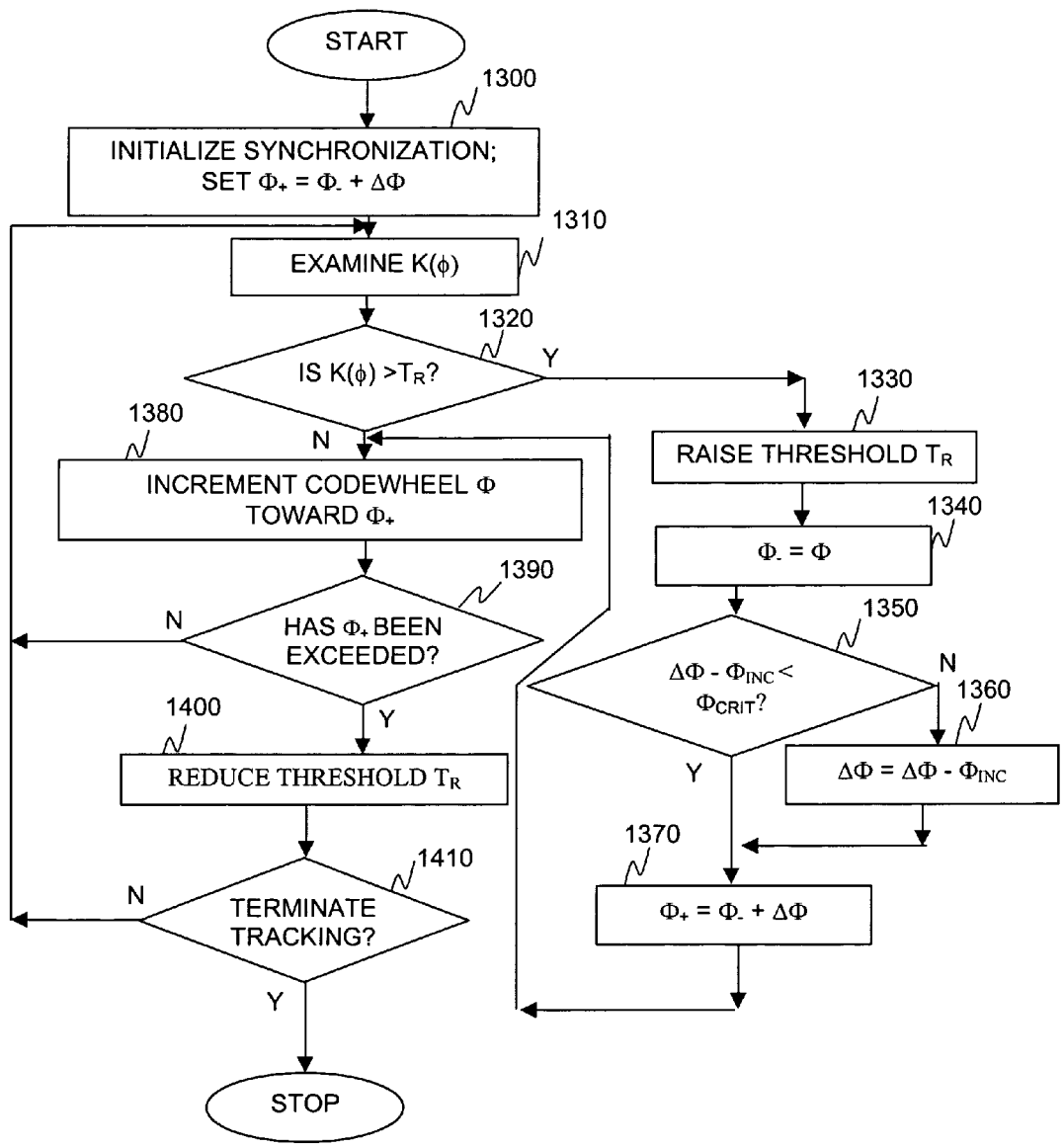
FIG. 12 is a flowchart of an embodiment for transitioning between a full phase range scan to a limited phase range scan.

FIG. 12 is a flowchart of an embodiment for performing a non-exhaustive code wheel search to find a sufficient (not necessarily optimal) synchronization phase. In step 1300, synchronization is initialized by setting the range of the phase search $\phi_-$ and $\phi_+$. $\phi_-$ is set to a predetermined initial value, and $\phi_+$ is set to the sum of $\phi_-$ plus $\Delta\phi$, where $\Delta\phi$ is set to a predetermined initial phase search width. In step 1310, the correlation estimate for the current phase offset, $K(\phi)$, is examined. In step 1320, $K(\phi)$ is compared to a magnitude threshold value $T_R$. If $K(\phi)$ not greater than $T_R$, the flow process skips to step 1380. Otherwise, in step 1330, $T_R$ is increased. In step 1340, $\phi_-$ is set to $\phi$. In step 1350, if $\Delta\phi-\phi_{INC}$ is less than the predetermined $\phi_{CRIT}$, then the flow process skips to step 1370. Otherwise, in step 1360, $\Delta\phi$ is set to $\Delta\phi$ minus $\phi_{INC}$. In step 1370, $\phi_+$ is set to $\phi_-$ plus $\Delta\phi$. In step 1380, the code wheel phase $\phi$ is incremented toward $\phi_+$. In step 1390, if $\phi$ does not $\phi_+$, then the flow process returns to step 1310. Otherwise, in step 1400, $T_R$ is reduced. In step 1410, if tracking is decided to terminate, the flow process stops. Otherwise, the process flow returns to step 1310.

Figure 13:
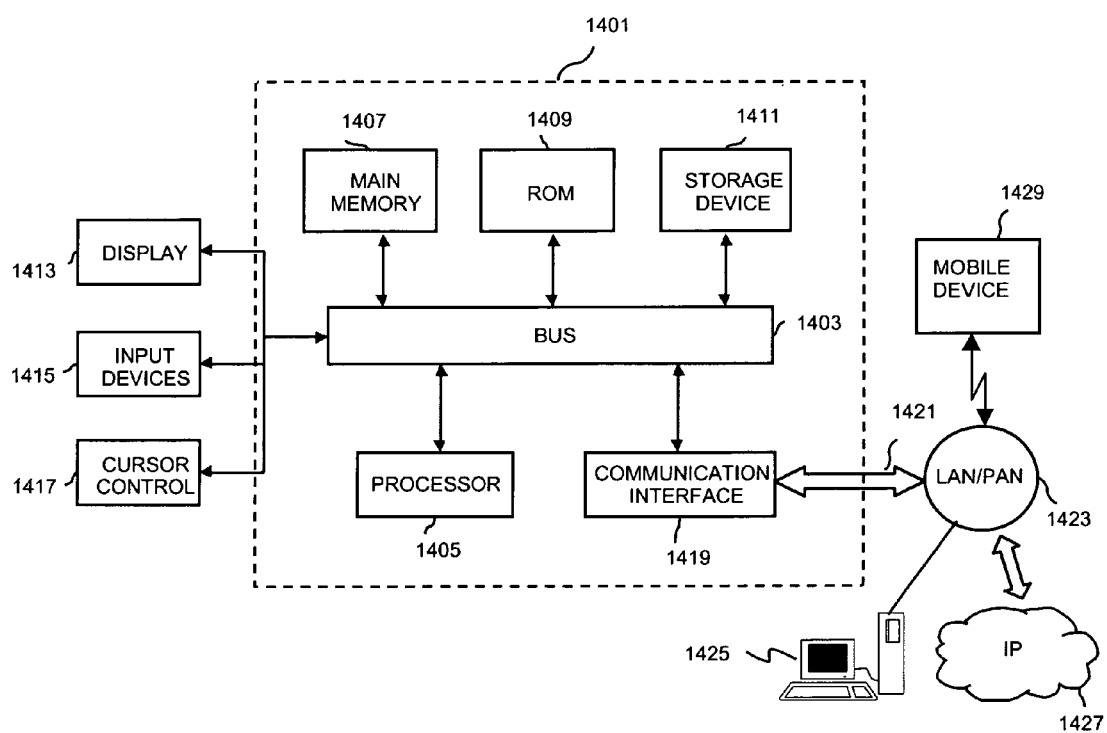
FIG. 13 illustrates a processor system upon which an embodiment according to the present invention may be implemented.

FIG. 13 illustrates a processor system 1401 upon which an embodiment according to the present invention may be implemented. The system 1401 includes a bus 1403 or other communication mechanism for communicating information, and a processor 1405 coupled with the bus 1403 for processing the information. The processor system 1401 also includes a main memory 1407, such as a random access memory (RAM) or other dynamic storage device (e.g., dynamic RAM (DRAM), static RAM (SRAM), synchronous DRAM (SDRAM), flash RAM), coupled to the bus 1403 for storing information and instructions to be executed by the processor 1405. In addition, a main memory 1407 may be used for storing temporary variables or other intermediate information during execution of instructions to be executed by the processor 1405. The system 1401 further includes a read only memory (ROM) 1409 or other static storage device (e.g., programmable ROM (PROM), erasable PROM (EPROM), and electrically erasable PROM (EE-PROM)) coupled to the bus 1403 for storing static information and instructions for the processor 1405. A storage device 1411, such as a magnetic disk or optical disc, is provided and coupled to the bus 1403 for storing information and instructions.

The processor system 1401 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 1401 may additionally include a compact disc reader, a compact disc reader-writer unit, or a compact disc juke box, each of which may be connected to the same device bus or another device bus.

The processor system 1401 may be coupled via the bus 1403 to a display 1413, such as a cathode ray tube (CRT) or liquid crystal display (LCD) or the like, for displaying information to a system user. The display 1413 may be controlled by a display or graphics card. The processor system 1401 includes input devices, such as a keyboard or keypad 1415 and a cursor control 1417, for communicating information and command selections to the processor 1405. The cursor control 1417, for example, is a mouse, a trackball, or cursor direction keys for communicating direction information and command selections to the processor 1405 and for controlling cursor movement on the display 1413. In addition, a printer may provide printed listings of the data structures or any other data stored and/or generated by the processor system 1401.

The processor system 1401 performs a portion or all of the processing steps of the invention in response to the processor 1405 executing one or more sequences of one or more instructions contained in a memory, such as the main memory 1407. Such instructions may be read into the main memory 1407 from another computer-readable medium, such as a storage device 1411. One or more processors in a multi-processing arrangement may also be employed to execute the sequences of instructions contained in the main memory 1407. In alternative embodiments, hard-wired circuitry may be used in place of or in combination with software instructions. Thus, embodiments are not limited to any specific combination of hardware circuitry and software.

As stated above, the processor system 1401 includes at least one computer readable medium or memory programmed according to the teachings of the invention and for containing data structures, tables, records, or other data described herein. Stored on any one or on a combination of computer readable media, the present invention includes software for controlling the system 1401, for driving a device or devices for implementing the invention, and for enabling the system 1401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 1405 for execution. A computer readable medium may take many forms, including but not limited to, non-volatile media, volatile media, and transmission media. Non-volatile media includes, for example, optical, magnetic disks, and magneto-optical disks, such as the storage device 1411. Volatile media includes dynamic memory, such as the main memory 1407. Transmission media includes coaxial cables, copper wire and fiber optics, including the wires that comprise the bus 1403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 1405 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 1401 may receive the data on the telephone line and use an infrared transmitter to convert the data to an infrared signal. An infrared detector coupled to the bus 1403 can receive the data carried in the infrared signal and place the data on the bus 1403. The bus 1403 carries the data to the main memory 1407, from which the processor 1405 retrieves and executes the instructions. The instructions received by the main memory 1407 may optionally be stored on a storage device 1411 either before or after execution by the processor 1405.

The processor system 1401 also includes a communication interface 1419 coupled to the bus 1403. The communications interface 1419 provides a two-way UWB data communication coupling to a network link 1421 that is connected to a communications network 1423 such as a local network (LAN) or personal area network (PAN) 1423. For example, the communication interface 1419 may be a network interface card to attach to any packet switched UWB-enabled personal area network (PAN) 1423. As another example, the communication interface 1419 may be a UWB accessible asymmetrical digital subscriber line (ADSL) card, an integrated services digital network (ISDN) card, or a modem to provide a data communication connection to a corresponding type of communications line. The communications interface 1419 may also include the hardware to provide a two-way wireless communications coupling other than a UWB coupling, or a hardwired coupling to the network link 1421. Thus, the communications interface 1419 may incorporate the UWB transceiver of FIG. 2 and/or FIG. 3 as part of a universal interface that includes hardwired and non-UWB wireless communications coupling to the network link 1421.

The network link 1421 typically provides data communication through one or more networks to other data devices. For example, the network link 1421 may provide a connection through a LAN to a host computer 1425 or to data equipment operated by a service provider, which provides data communication services through an IP (Internet Protocol) network 1427. Moreover, the network link 1421 may provide a connection through a PAN 1423 to a mobile device 1429 such as a personal data assistant (PDA) laptop computer, or cellular telephone. The LAN/PAN communications network 1423 and IP network 1427 both use electrical, electromagnetic or optical signals that carry digital data streams. The signals through the various networks and the signals on the network link 1421 and through the communication interface 1419, which carry the digital data to and from the system 1401, are exemplary forms of carrier waves transporting the information. The processor system 1401 can transmit notifications and receive data, including program code, through the network(s), the network link 1421 and the communication interface 1419.

Figure 14A:
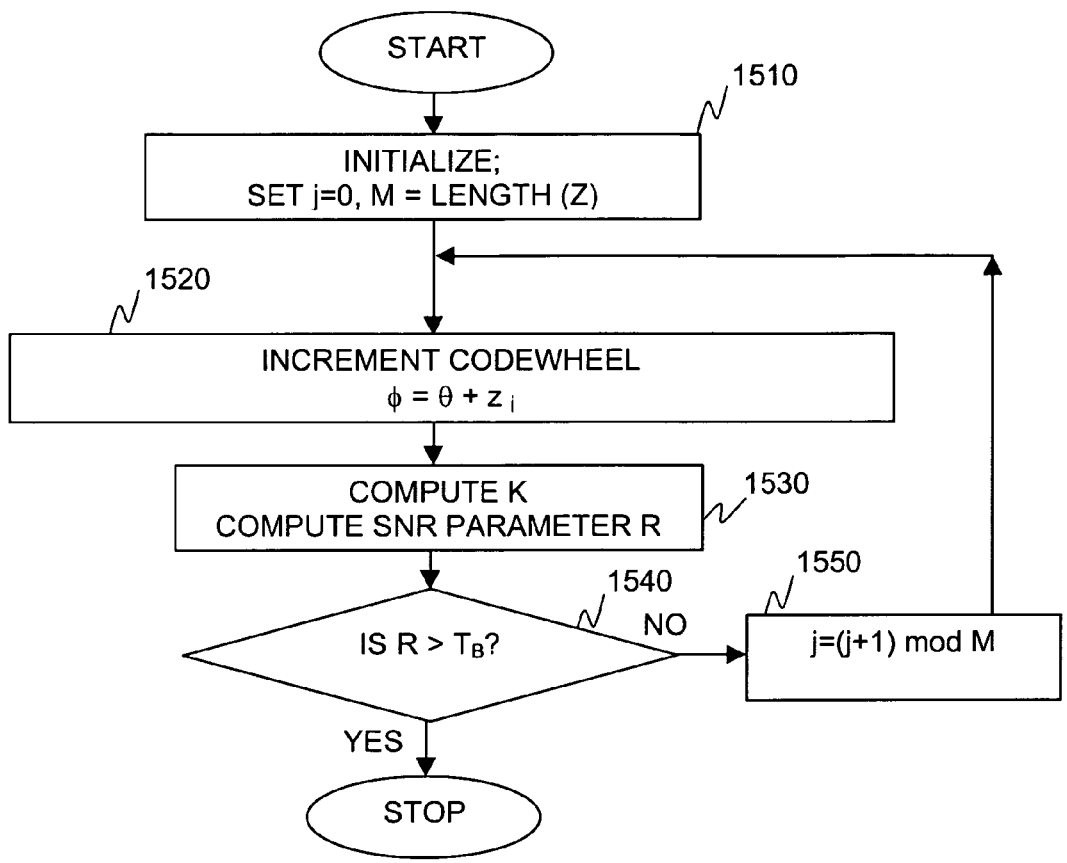
FIGS. 14A–B illustrate exemplary process flows for acquiring and/or tracking a received pulse train.

FIG. 14A is a flowchart of an embodiment for performing a non-exhaustive code wheel search to find a sufficient (not necessarily optimal) synchronization phase using either linear or non-linear phase scans over the code wheel. In step 1510, the process is initialized. A vector Z of phase offsets is defined. M is calculated as the length of the phase offset vector Z. Define $z_j$ as the elements of vector Z, such that $Z=[z_0, \ldots, z_{M-1}]$. Initialize the counter j to zero. Some example Z vectors are shown in FIG. 15 and described later.

In step 1520, the phase offset, $\phi$, is incremented by $z_j$ from the initial phase offset $\theta$, which may be random, such that $\phi=\theta+z_j$. In step 1530, the correlation estimate for the current phase offset, K, is computed. K is then used to compute the SNR parameter R. This can be done by methods described in, for example, co-pending U.S. patent application entitled "MODE CONTROLLER FOR SIGNAL ACQUISITION AND TRACKING IN AN ULTRA WIDEBAND COMMUNICATIONS SYSTEM," Ser. No. 09/685,197, filed concurrently with the present document and having common inventorship as with the present document, the contents of which being incorporated herein by reference.

As discussed in the above referenced co-pending patent, parameters can be calculated that are related to signal power and noise power. Specifically, as described in an example embodiment in the above referenced co-pending patent, the A/D sample value for bit i, $x_i$, can be statistically represented as Equation 1 for A/σ greater than 2.3 where A is the received signal amplitude and σ is the noise standard deviation.

$$|x_i|=A+\sigma n_i \quad (1)$$

Through mathematical manipulations, a combination of these parameters can be compared to a threshold to establish a maximal BER operating point. More specifically, a minimal SNR point can be defined for radio operation. Through use of these easy to calculate and low-cost parameters, an instantaneous estimate of the current SNR of the receiver is available for the purposes of making control decisions such as whether or not a correlator arm is locked onto a received signal. Specifically, as described in an example embodiment in the above referenced co-pending patent, a lock parameter L can be calculated as:

$$L = \text{sign}(m_1 - Ks_1) \quad (2)$$

where $$m_1 = \left(\sum_{i=1}^{B} |x_i|\right)^2 \quad (3)$$

$$s_1 = \sum_{i=1}^{B} x_i^2 \quad (4)$$

and $K$ is chosen such that $$\frac{A^2}{\sigma^2} > \frac{K-1}{B-K}. \quad (5)$$

Parameters other than $m_1$ and $s_1$ as defined above can employed in a similar manner as detailed in the above referenced co-pending patent.

In step 1540, if R is greater than a threshold indicative of a minimal acceptable SNR, $T_b$, then the flow process ends. Otherwise, in step 1550, j is incremented to cycle through the vector Z according to the equation j=(j+1)mod(M). The process then returns to step 1520.

Figure 14B:
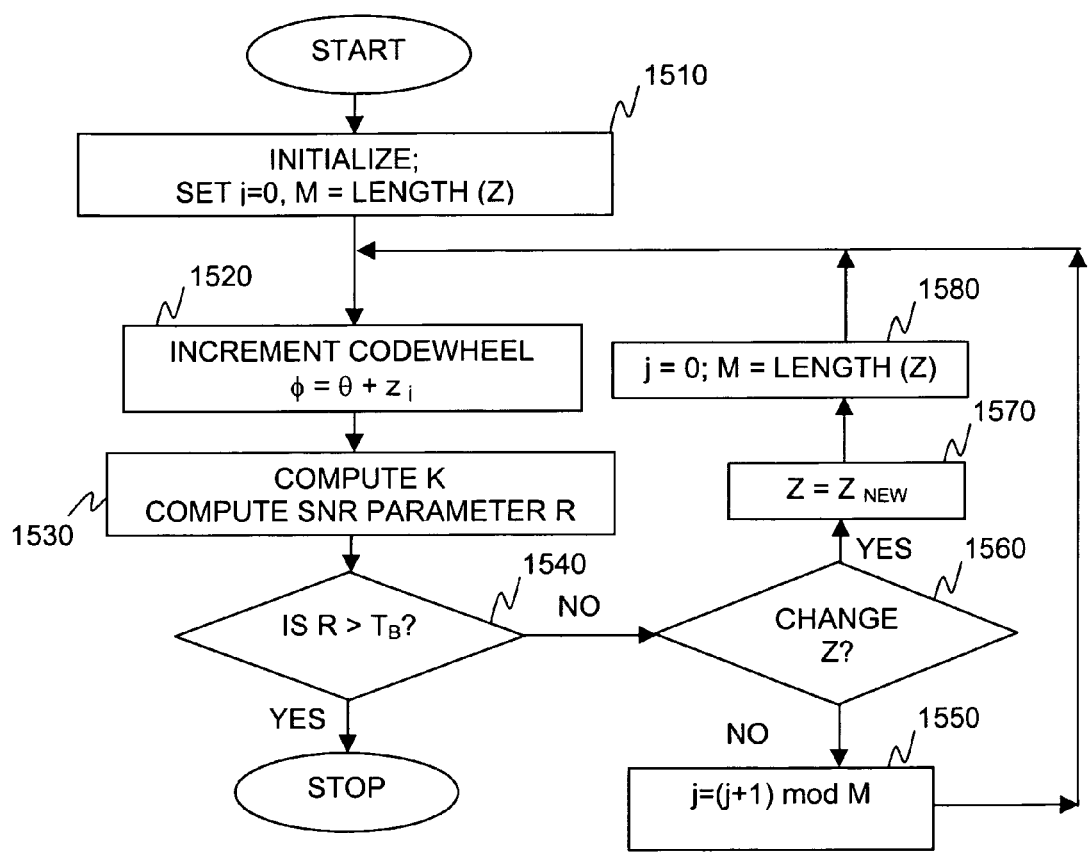

FIG. 14B is also a flowchart of an embodiment for performing a non-exhaustive code wheel search to find a sufficient (not necessarily optimal) synchronization phase using either linear or non-linear phase scans over the code wheel. In step 1510, the process is initialized as in FIG. 14A. In step 1520, the phase offset, $\phi$, is incremented by $z_j$ from the initial phase offset $\theta$, which may be random, such that $\phi=\theta+z_j$. In step 1530, the correlation estimate for the current phase offset, K, is computed. K is then used to compute the SNR parameter R as described in FIG. 14A. In step 1540, if R is greater than a threshold indicative of a minimal acceptable SNR, $T_b$, then the flow process ends. Otherwise, in step 1560, a decision is made whether to change the vector Z. If Z is not going to be changed, the flow proceeds to step 1550 where j is incremented to cycle through the vector Z according to the equation j=(j+1)mod(M) and then process then returns to step 1520. Otherwise, the flow proceeds from step 1560 to step 1570 where Z is set to a new Z. In step 1580, j is reset to zero, and M is calculated to be the length of the new Z.

Figure 15A:
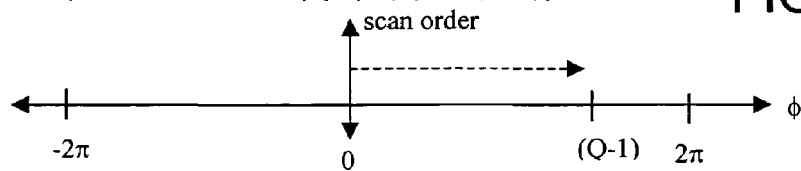
FIGS. 15A–D describe and illustrate example vectors that contain elements corresponding to shifts in phase angle from an initial phase angle.

FIGS. 15A–D describe and illustrate example vectors that contain elements corresponding to shifts in phase angle from an initial phase angle. FIG. 15A illustrates an example vector Z1 that corresponds to a continuous scan from an initial or zero phase to a maximum phase. The duration of the phase can be less than $2\pi$ radians. As illustrated in FIG. 15A, this maximum number of code wheel increments is less than $2\pi$ radians, although this need not be the case. Since the phase increases monotonically by a fixed increment throughout Z1, Z1 is referred to as linear phase scan. The written vector representation of Z1 includes the term "n" which denotes an arbitrary local parameter that controls how fast the code wheel spins depending on the time increment step size, and can be adjusted to accommodate, for example, the finite time that it takes a phase shift to a new, discrete phase, to occur. As n is decreased, the time resolution of the phase scan increases. "Q" is the total number of code wheel increments in each of the defined vectors of FIGS. 15A–D.

Figure 15B:
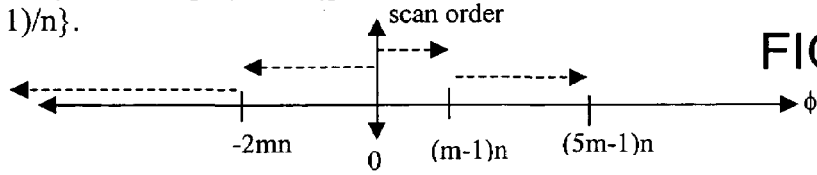

The first example of vector Z2, illustrated both as a plot and in written notation in FIG. 15B, describes a bidirectional scan that steps between portions of the phase to be scanned. In other words, the phase scan described by the first example of vector Z2 commences with the zero phase position and proceeds in discrete steps through an arbitrary number of m steps to a phase corresponding to m−1 increments. "m" is a number of phase increments that is strictly less than the total number of increments in the vector Z2. At this point, the code wheel rotates to a position one phase increment prior to the initial (or zero) phase, at which time the code wheel proceeds to scan negatively through 2m steps to a phase corresponding to −2m increments. Once this portion of the scan is completed, the code wheel returns to a phase corresponding to a positive m increments, and proceeds as indicated in both the written and plot description of the vector. The scan order axis of the plot indicates the succession of these phase scans in time, with the first scan being represented at the highest position along this axis. Furthermore, the phase shift corresponding to Q−1 (the full phase range) has been left off of the phase axis of FIGS. 15B (and 15C and 15D) in order to illustrate that the phase shift corresponding to Q−1 could be found on either side of the zero or initial phase position, and could stop the phase scan at any phase angle, even those within the illustrated or written vector. By scanning phase shifts that are closest to the zero or initial phase first, the phase shifts with the highest probability of synchronizing the locally-generated pulse train with the received pulse train are examined first, especially in cases when a communications link has already been established, and an attempt is being made to reestablish the link.

Figure 15C:
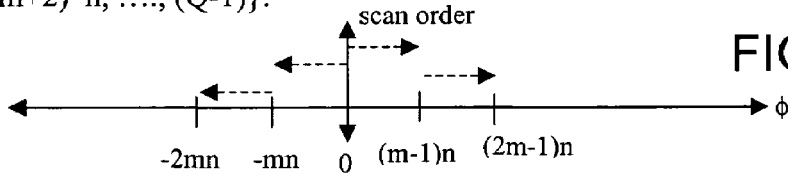

The second example of vector Z2, illustrated both as a plot and in written notation in FIG. 15C, describes a bidirectional scan that steps between portions of the phase to be scanned, where the portions to be scanned are the same size. This approach is slightly less efficient than the approach illustrated in FIG. 15B since the number of steps is increased while the relative proximity of the scanned phase angles to the zero or initial phase angle is the same.

Figure 15D:
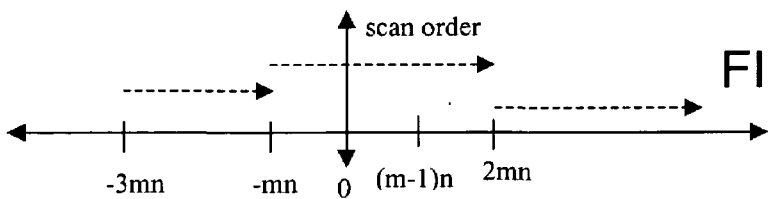

The third example vector Z2, illustrated both as a plot and in written notation in FIG. 15D, describes a unidirectional scan that steps between portions of the phase to be scanned, where the portions to be scanned are scanned in order of proximity to the zero or initial phase angle. In other words, the phase is first incremented from a negative phase angle corresponding to −m increments of the code wheel through the zero or initial phase angle to a positive phase angle corresponding to +2m increments of the code wheel. At this time, the code wheel is returned to a negative phase angle corresponding to −3m increments of the code wheel, and proceeds to increment the code wheel in a positive direction from a negative phase angle corresponding to −m−1 increments of the code wheel, at which time it proceeds as illustrated. Thus, in this example vector Z2, unidirectional scanning of the phase can be used to scan the regions closest to the initial or zero position of the phase angle.

FIG. 15A presents an example of a linear phase scan whereas FIGS. 15B–D present examples of non-linear phase scans. These examples are only illustrative. Other embodiments of scanning phase over a code wheel are also applicable to the present invention.

In FIG. 14, the scan vector Z may be either Z1 or Z2 as illustrated in FIGS. 15A–D, or any combination of these or other phase scans. For example, Z could be appended copies of different embodiments of Z2 and Z1. Preferably, the resulting phase scan vector Z covers the entire code wheel, perhaps not uniquely.

The UWB transceiver described herein may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 2 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

The present invention thus also includes a computer-based product which may be hosted on a storage medium and include instructions which can be used to program a computer to perform a process in accordance with the present invention. This storage medium can include, but is not limited to, any type of disk including floppy disk, optical disk, CD-ROMs, magneto-optical disk, ROMs, RAMs, EPROMs, EEPROMs, flash memory, magnetic or optical cards, or any type of medium suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method for synchronizing a UWB receiver with an incoming UWB signal, comprising steps of:
   receiving the incoming UWB signal;
   generating a receiver signal at the UWB receiver;
   analyzing the incoming UWB signal in light of the receiver signal to produce an analysis result;
   comparing a parameter of the analysis result with a predetermined threshold to produce a comparison result;
   shifting a phase of said receiver signal when said parameter of said analysis result is beyond said predetermined threshold;
   changing a value of said predetermined threshold; and
   repeating said steps of comparing and shifting using the changed predetermined threshold.

2. The method according to claim 1, wherein the step of analyzing the incoming UWB signal comprises:
   correlating the receiver signal with the incoming UWB signal, the analysis result being a correlation.

3. The method according to claim 2, wherein the predetermined threshold being a predetermined magnitude of the correlation.

4. The method according to claim 1, wherein the predetermined threshold being a predetermined signal to noise ratio.

5. The method according to claim 1, wherein the predetermined threshold being a predetermined bit error rate.

6. The method according to claim 1, wherein the predetermined threshold being a predetermined value of a lock parameter.

7. The method according to claim 1, further comprising a step of:
   amplifying the received incoming UWB signal to produce an amplified incoming UWB signal.

8. The method according to claim 7, wherein the step of amplifying comprises a step of:
   maintaining a substantially constant magnitude of a correlation between the incoming UWB signal and the receiver signal.

9. The method according to claim 7, wherein the step of amplifying comprises a step of:
   maintaining a substantially constant bit error rate.

10. The method according to claim 7, wherein the step of amplifying comprises a step of:
    obtaining a substantially constant noise in the amplified incoming UWB signal.

11. The method according to claim 7, wherein said amplified incoming UWB signal is used as said incoming UWB signal in said step of analyzing.

12. The method according to claim 1, wherein the incoming UWB signal comprises at least one of bi-phase-modulated pulses and quadrature phase-modulated pulses.

13. The method according to claim 1, wherein the incoming UWB signal comprises multilevel pulses.

14. The method according to claim 1, wherein the repeating of said steps of analyzing, comparing and shifting is done until said parameter of said analysis result is beyond said predetermined threshold.

15. The method according to claim 1, further comprising a step of:
    comparing said changed predetermined threshold with an extreme threshold; and
    changing said predetermined threshold to an initial threshold value when said changed predetermined threshold is beyond said extreme threshold.

16. The method according to claim 1, wherein said step of analyzing the incoming UWB signal comprises a step of:
    determining a lock parameter indicative of an average noise and an average signal strength.

17. The method according to claim 16, wherein said step of determining a lock parameter comprises:
    calculating $L=\text{sign}(m_1-Ks_1)$
    wherein L is a lock parameter, $m_1$ is a first measurement of a signal-to-noise relationship, K is a constant value, and $s_1$ is a second measurement of a signal-to-noise relationship.

18. A system for synchronizing a UWB receiver with an incoming UWB signal, comprising:
    an antenna configured to receive the incoming UWB signal;
    a receiver signal generator configured to generate a receiver signal at the UWB receiver;
    an analyzer configured to analyze the incoming UWB signal in light of the receiver signal to produce an analysis result;
    a comparator configured to compare a parameter of the analysis result with a predetermined threshold to produce a comparison result; and
    a phase shifter configured to shift a phase of the receiver signal when said parameter of said analysis result is beyond said predetermined threshold,
    wherein the comparator can change a value of said predetermined threshold.

19. The system according to claim 18, wherein said analyzer comprises:

a correlator configured to correlate the receiver signal with the incoming UWB signal, the analysis result being a correlation.

20. The system according to claim 19, wherein the predetermined threshold comprises a predetermined magnitude of the correlation.

21. The system according to claim 19, wherein the correlator comprises:
a phase adjuster configured to adjust a phase of the local pulses; and
a calculator configured to calculate a correlation between the receiver signal and the incoming UWB signal.

22. The system according to claim 18, wherein the predetermined threshold comprises a predetermined signal to noise ratio.

23. The system according to claim 18, wherein the predetermined threshold comprises a predetermined bit error rate.

24. The system according to claim 18, wherein the predetermined threshold comprises a predetermined value of a lock parameter.

25. The system according to claim 18, further comprising:
an amplifier configured to amplify the received incoming UWB signal to produce an amplified incoming UWB signal.

26. The system according to claim 25, wherein said amplifier further comprises:
a feedback loop configured to maintain a substantially constant magnitude of a correlation between the incoming UWB signal and the receiver signal.

27. The system according to claim 25, wherein said amplifier further comprises:
a feedback loop configured to maintain a substantially constant bit error rate.

28. The system according to claim 25, wherein said amplifier further comprises:
a feedback loop configured to maintain a substantially constant noise in the amplified incoming UWB signal.

29. The system according to claim 25, wherein said amplified incoming UWB signal is used as said incoming UWB signal in said step of analyzing.

30. The system according to claim 18, wherein the incoming UWB signal comprises at least one of bi-phase-modulated pulses and quadrature phase-modulated pulses.

31. The system according to claim 18, wherein the incoming UWB signal comprises multilevel pulses.

32. The system according to claim 18, further comprising a subtractor configured to reduce said predetermined threshold by a given amount.

33. The system according to claim 18, wherein the comparator comprises:
a location mechanism configured to locate a first phase angle at which said parameter of the analysis result is beyond said predetermined threshold;
a phase scan range setting mechanism configured to define a phase scan range relative to said first phase angle.

34. A system for synchronizing a UWB receiver with an incoming UWB signal, comprising:
means for receiving the incoming UWB signal;
means for generating a receiver signal at the UWB receiver;
means for analyzing the incoming UWB signal in light of the receiver signal to produce an analysis result;
means for comparing a parameter of the analysis result with a predetermined threshold to produce a comparison result; and
means for shifting a phase of the receiver signal when said parameter of said analysis result is beyond said predetermined threshold,
wherein the means for comparing can change a value of said predetermined threshold.

35. A method for synchronizing a UWB receiver with an incoming UWB signal, comprising steps of:
receiving the incoming UWB signal;
generating a receiver signal at the UWB receiver;
analyzing the incoming UWB signal in light of the receiver signal over a phase range greater than 0 radians and less than $2\pi$ radians to produce an analysis result;
locating a desired phase angle within the phase range using the analysis result; and
shifting a phase of the receiver signal to the desired phase angle.

36. The method according to claim 35, wherein the step of analyzing the incoming UWB signal comprises:
correlating the receiver signal with the incoming UWB signal, the analysis result being a correlation.

37. The method according to claim 35, wherein the phase range being less than $\pi$ radians.

38. The method according to claim 37, wherein the phase range being less than $\pi/2$ radians.

39. The method according to claim 38, wherein the phase range being less than $\pi/3$ radians.

40. The method according to claim 39, wherein the phase range being less than $\pi/4$ radians.

41. The method according to claim 40, wherein the phase range being less than $\pi/8$ radians.

42. The method according to claim 35, wherein the desired phase angle being an angle with a maximum analysis result.

43. The method according to claim 35, wherein the desired phase angle being an angle with the analysis result above a threshold analysis result.

44. The method according to claim 35, wherein the analysis result being a correlation.

45. The method according to claim 35, wherein the analysis result being a bit error rate.

46. The method according to claim 35, wherein the analysis result being a signal to noise ratio.

47. The method according to claim 35, wherein the analysis result being a lock parameter.

48. The method according to claim 35, further comprising a step of:
amplifying the received incoming UWB signal to produce an amplified incoming UWB signal.

49. The method according to claim 48, wherein the step of amplifying comprises a step of:
maintaining a substantially constant magnitude of a correlation between the incoming UWB signal and the receiver signal.

50. The method according to claim 48, wherein the step of amplifying comprises a step of:
maintaining a substantially constant bit error rate.

51. The method according to claim 48, wherein the step of amplifying comprises a step of:
obtaining a substantially constant noise in the amplified incoming UWB signal.

52. The method according to claim 48, wherein said amplified incoming UWB signal is used as said incoming UWB signal in said step of analyzing.

53. The method according to claim 35, wherein the incoming UWB signal comprises at least one of bi-phase-modulated pulses and quadrature phase-modulated pulses.

54. The method according to claim 35, wherein the incoming UWB signal comprises multilevel pulses.

55. The method according to claim 35, further comprising steps of:
 changing a value of said phase range; and
 repeating said steps of comparing and shifting using the changed phase range.

56. The method according to claim 35, wherein said step of analyzing further comprises a step of:
 scanning a phase range along a phase range vector to a vector maximum phase.

57. The method according to claim 56, further comprising a step of:
 changing the vector maximum phase; and
 repeating said step of scanning until said vector maximum phase is beyond a predetermined extreme vector maximum phase.

58. The method according to claim 56, wherein said step of changing the vector maximum phase comprises reducing the vector maximum phase.

59. The method according to claim 35, wherein the step of analyzing the incoming UWB signal comprises:
 determining a lock parameter indicative of an average noise and an average signal strength.

60. The method according to claim 59, wherein said step of determining a lock parameter comprises:
 calculating $L = \text{sign}(m_1 - Ks_1)$,
 wherein L is a lock parameter, $m_1$ is a first measurement of a signal-to-noise relationship, K is a constant value, and $s_1$ is a second measurement of a signal-to-noise relationship.

61. The method according to claim 35, wherein the step of analyzing the incoming UWB signal comprises:
 determining a signal to noise ratio.

62. A system for synchronizing a UWB receiver with an incoming UWB signal, comprising:
 an antenna configured to receive the incoming UWB signal;
 a receiver signal generator configured to generate a receiver signal at the UWB receiver;
 an analyzer configured to analyze the incoming UWB signal in light of the receiver signal over a phase range greater than 0 radians and less than $2\pi$ radians to produce an analysis result;
 a locator configured to locate a desired phase angle within the phase range using the analysis result; and
 a phase shifter configured to shift a phase of the receiver to the desired phase angle.

63. The system according to claim 62, wherein said analyzer comprises:
 a correlator configured to correlate the receiver signal with the incoming UWB signal, the analysis result being a correlation.

64. The system according to claim 63, wherein the correlator comprises:
 a phase adjuster configured to adjust a phase of the local pulses; and
 a calculator configured to calculate a correlation between the receiver signal and the incoming UWB signal.

65. The system according to claim 62, wherein the phase range comprising a phase range less than $\pi$ radians.

66. The system according to claim 65, wherein the phase range comprising a phase range less than $\pi/2$ radians.

67. The system according to claim 66, wherein the phase range comprising a phase range less than $\pi/3$ radians.

68. The system according to claim 67, wherein the phase range comprising a phase range less than $\pi/4$ radians.

69. The system according to claim 68, wherein the phase range comprising a phase range less than $\pi/8$ radians.

70. The system according to claim 62, wherein the desired phase angle comprises an angle with a maximum analysis result.

71. The system according to claim 62, wherein the desired phase angle comprises an angle with the analysis result above a threshold analysis result.

72. The system according to claim 62, wherein the analysis result comprises a correlation.

73. The system according to claim 62, wherein the analysis result comprises a bit error rate.

74. The system according to claim 62, wherein the analysis result comprises a signal to noise ratio.

75. The system according to claim 62, wherein the analysis result comprises a lock parameter.

76. The system according to claim 62, further comprising:
 an amplifier configured to amplify the received incoming UWB signal to produce an amplified incoming UWB signal.

77. The system according to claim 76, wherein said amplifier further comprises:
 a feedback loop configured to maintain a substantially constant magnitude of a correlation between the incoming UWB signal and the receiver signal.

78. The system according to claim 76, wherein said amplifier further comprises:
 a feedback loop configured to maintain a substantially constant bit error rate.

79. The system according to claim 76, wherein said amplifier further comprises:
 a feedback loop configured to maintain a substantially constant noise in the amplified incoming UWB signal.

80. The system according to claim 76, wherein said amplified incoming UWB signal is used as said incoming UWB signal in said step of analyzing.

81. The system according to claim 62, wherein the incoming UWB signal comprises at least one of bi-phase-modulated pulses and quadrature phase-modulated pulses.

82. The method according to claim 62, wherein the incoming UWB signal comprises multilevel pulses.

83. The system according to claim 62, further comprising a range minimizer configured to reduce the scan range by a given amount.

84. The system according to claim 62, wherein the locator further comprises:
 a phase scan range setting mechanism configured to define the scan range relative to the desired phase angle.

85. A system for synchronizing a UWB receiver with an incoming UWB signal, comprising:
 means for receiving the incoming UWB signal;
 means for generating a receiver signal at the UWB receiver;
 means for analyzing the incoming UWB signal in light of the receiver signal over a phase range greater than 0 radians and less than $2\pi$ radians to produce an analysis result;
 means for locating a desired phase angle within the phase range using the analysis result; and
 means for shifting a phase of the receiver signal to the desired phase angle.

\* \* \* \* \*